(12) United States Patent
Okuyama et al.

(10) Patent No.: US 7,315,590 B1
(45) Date of Patent: Jan. 1, 2008

(54) REVERSE SPREADING DEVICE, TIMING DETECTING DEVICE, CHANNEL ESTIMATING DEVICE, FREQUENCY ERROR MEASUREMENT METHOD AND AUTOMATIC FREQUENCY CONTROL METHOD

(75) Inventors: Toshiyuki Okuyama, Tokyo (JP); Osamu Ohnishi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 631 days.

(21) Appl. No.: 09/602,558

(22) Filed: Jun. 23, 2000

(30) Foreign Application Priority Data

Jun. 23, 1999 (JP) ................................. 11-177098
Nov. 4, 1999 (JP) ................................. 11-313900

(51) Int. Cl.
H04L 27/06 (2006.01)

(52) U.S. Cl. ........................................ 375/344; 375/147

(58) Field of Classification Search ................ 375/142, 375/143, 147, 150, 152, 344
See application file for complete search history.

(56) References Cited

U.S. PATENT DOCUMENTS

| | | | |
|---|---|---|---|
| 4,621,365 A | 11/1986 | Chiu | |
| 5,179,573 A * | 1/1993 | Paradise | ..................... 375/150 |
| 5,285,472 A | 2/1994 | Leonard et al. | |
| 5,566,202 A | 10/1996 | Lang | |
| 5,912,919 A * | 6/1999 | Lomp et al. | ................. 375/149 |

FOREIGN PATENT DOCUMENTS

| | | |
|---|---|---|
| GB | 2 329 307 | 3/1999 |
| JP | 6-77932 | 3/1894 |
| JP | 09200081 | 7/1997 |
| JP | 2000-232393 | 8/2000 |

OTHER PUBLICATIONS

An Office Action issued by the Japaense Patent Office on Apr. 3, 2002.

* cited by examiner

Primary Examiner—David B. Lugo
(74) Attorney, Agent, or Firm—Michael Best & Friedrich LLP

(57) ABSTRACT

A reverse spreading device is provided which is capable of performing timing detection and channel estimation even in a large frequency offset environment without great increases in its circuit scale and its power consumption and of expanding a range being within the AFC (Automatic Frequency Control) for the frequency offset. A multiplication is made by multipliers between complex base band signals and spread codes and then resulting n-pieces of multiplied values are integrated by m-pieces of adders for every k-pieces of multiplied values to produce m-pieces of complex intermediate signals before obtaining complex symbols. A probability of correct synchronization is increased by providing a frequency offset to m-pieces of complex intermediate signals using phase rotators to compensate for rotation within one symbol period and to obtain a great spreading gain. A range being within the AFC for the frequency offset is expanded since a phase error is corrected before a production of the complex symbol signals.

5 Claims, 18 Drawing Sheets

REVERSE SPREADING DEVICE, TIMING DETECTING DEVICE, CHANNEL ESTIMATING DEVICE, FREQUENCY ERROR MEASUREMENT METHOD AND AUTOMATIC FREQUENCY CONTROL METHOD

CROSS REFERENCE TO RELATED APPLICATIONS

This application claims priority based on Japanese Patent Application No. Hei 11-177098, filed Jun. 23, 1999; and Hei 11-313900, filed Nov. 4, 1999, the disclosures of which are incorporated herein by reference.

BACKGROUND OF THE INVENTION

1. Field of the Invention

The present invention relates to a CDMA (Code Division Multiple Access) communication system and more particularly to a reverse spreading device being capable of performing timing detection and channel estimation even in a large frequency offset environment.

2. Description of the Related Art

Recently, a CDMA communication system being highly tolerant of interference is widely used as on of the communication methods employed in a mobile communication system. The CDMA communication system is a communication method in which a sender transmits a user signal after spreading it using a spread code (one-bit signal) and a receiver obtains an original user signal by reversely spreading a received signal using a same spread code as used on a sender side. Because of his, the received signal cannot be reversely spread by the receiver unless a phase of the spread code string of the receiver is synchronized to that of the spread code string used by the sender. To achieve this, at a mobile station, TCXO (Temperature Compensated Crystal Oscillator) having a high frequency precision is used as a reference oscillator used to generate a reference frequency signal required for demodulation of a signal received from a base station. However, since the mobile station must be made small and be highly cost-effective, it is natural that a frequency precision of a reference oscillator used for the mobile station is lower than that of the reference oscillator used for the base station.

Therefore, an AFC (Automatic Frequency Control) is exercised at the mobile station in order to match frequency of the reference frequency signal to that of the reference frequency signal sent from the base station by the sender.

Configurations of the mobile station in which the AFC is exercised will be described by referring to FIG. 12. In the following description, it is assumed that, in the CDMA communication system, one symbol signal is spread by using spread codes of n-pieces of chips.

The mobile station in FIG. 12 is composed of a radio section 1, a timing detecting device 4, a channel estimating device 5, a TCXO 6, a demodulating section 16 and an AFC circuit 17. The timing detecting device 4 has a reverse spreading device 7 and a peak detecting section 8. The channel estimating device 5 has a reverse spreading device 9 and a rotation correcting section 15.

The radio section 1 is adapted to perform quadrature detection of a received high frequency signal based on a reference frequency signal generated by the TCXO 6 and carries out an analog-digital conversion so that the received high frequency signal is converted to a base band signal 11 composed of a digital signal I component (meaning In-phase signal) and a base band signal 21 composed of another digital signal Q component (meaning Quadrature-phase signal).

TCXO 6 is operated to output the reference frequency signal whose frequency is controlled by the AFC circuit 17, as the reference frequency signal. The reverse spreading device 7 performs reverse spreading by multiplying the base band signal 11 and base band signal 21 one being composed of the I component and another being composed of the Q component fed from the radio section 1, by the spread code.

The peak detecting section 8 detects spreading timing which is timing in which a correlation value reaches a peak level when the reverse spreading is performed by the reverse spreading device 7. The reverse spreading device 9 is adapted to obtain a complex symbol by performing the reverse spreading of the base band signal 11 and base band signal 21 composed respectively of the I component and Q component fed from the radio section 1 using the spreading timing obtained by the peak detecting section 8.

Configurations of the reverse spreading devices 7 and reverse spreading device 9 implemented by using digital matched filters will be described by referring to FIG. 13.

Each of the reverse spreading device 7 and reverse spreading device 9 is composed of a correlator 110 and a correlator 120 respectively. The correlator 110, if an over-sampling is made at a time of receiving a signal, is composed of OSR x (n−1) pieces of delay devices 21 to $12_{OSR\ (n-1)}$, where the "OSR" represents an "over-sampling ratio" employed at the time of receiving the signal, n-pieces of multipliers $13_1$ to $13_n$ and an adder 14. Similarly, the correlator 120 is composed of OSR x (n−1) pieces of delay devices 22, to $22_{OSR(n-1)}$, n-pieces of multipliers $23_1$ to $23_n$ and an adder 24.

The correlator 110 is adapted to calculate a correlation value by allowing an inputted base band signal 11 composed of the I component to be shifted sequentially through the delay devices $12_1$ to $12_{OSR(n-1)}$ and to be multiplied sequentially by the spread code. The adder 14 calculates the correlation value containing the I component by adding each individual correlation value obtained sequentially to another individual correlation value. Similarly, in the correlator 120, a correlation value composed of the Q component is obtained by reversely spreading a base band signal 21 composed of the Q component using the spread code. The pair of correlation values containing the I component and Q component becomes a reversely spread complex symbol.

Configurations of the reverse spreading device 7 and reverse spreading device 9 implemented by using sliding correlators will be described by referring to FIG. 14.

Each of the reverse spreading device 7 and reverse spreading device 9 is composed of a correlator 60 and a correlator 70. The correlator 60 has a multiplier 62, an adder 63 and a delay device 64. The correlator 70 has a multiplier 72, an adder 73 and a delay device 74.

The correlator 60 is adapted to multiply an inputted base band signal 11 composed of the I component by a spread code for every chip using the multiplier 62. The n-pieces of values obtained by multiplying the resulting base band signal 11 by the spread code are integrated by an integrator composed of the adder 63 and delay device 64 to produce a correlation value containing the I component. Similarly, the correlator 70 is adapted to calculate a correlation value containing the Q component by reversely spreading the base band signal 21 composed of the Q component. The pair of correlation values containing the I component and Q component become the reversely spread complex symbol signal.

The rotation correcting section 15 (FIG. 12) detects a phase error contained in the complex symbol of the I component and Q component obtained from the reverse spreading device 9 and corrects the phase error.

Next, a channel estimation performed by the rotation correcting section 15 in the channel estimating device 5 will be described below.

Channel estimation represents processes of estimating a phase of the complex symbol which has been rotated due to frequency offset of the reference frequency signal at the mobile station or a like and of correcting the phase. The channel estimation is carried out by using a pilot symbol contained in data sent from the base station as a reference.

First, the pilot symbol is described. Frame configurations, designated according to a specification, of a perch channel of a forward link through which signal is sent from the base station to the mobile station are described below by referring to FIG. 15.

A 720 ms super frame constituting the perch channel is composed of 72 pieces of 10 ms radio frames $50_1$ to $50_{72}$. Each of the radio frames $50_1$ to $50_{72}$ contains 16 pieces of time slots $51_1$ to $51_{16}$. Each of the time slots $50_1$ to $50_{16}$ includes a search code symbol 52 composed of one symbol, a sending data symbol 53 composed of five symbols and a pilot symbol 54 composed of four symbols. Though the pilot symbol 54 has a different value for each of the time slots $50_1$ to $50_{16}$, its pattern is a predetermined pattern. Therefore, the mobile station can get information about the pattern of the pilot symbol 54 before the mobile station receives the pilot symbol 54. In the case of the perch channel frame configurations described above, the mobile station can make measurement of phase error and frequency error in signals sent by the base station by using the pilot symbols 54 with four symbols.

Four complex symbols constituting the pilot symbol 54 are plotted on a plane with the Q component as an ordinate and with the I component as an abscissa. If complex vectors 45, 46, 47 and 48 are given as shown in FIG. 16, there is a phase rotation by $\theta_1$ between the complex vector 45 and complex vector 46, by $\theta_2$ between the complex vector 46 and complex vector 47 and by $\theta_3$ between the complex vector 47 and complex vector 48.

The demodulating section 16 (FIG. 12) is adapted to obtain an original symbol by demodulating the complex symbol composed of the I and Q components, the phase error of which is corrected by the rotation correcting section 15. The AFC circuit 17 is operated to calculate frequency error which is a difference between frequency of the reference frequency signal generated by the TCXO 6 and reference frequency of signal from the base station and to control the frequency of the reference frequency signal generated by the TCXO 6 so as to reduce frequency errors.

At the conventional mobile station in which an AFC method is performed, even when the phase of the complex symbol obtained by the reverse spreading device 9 is rotated due to occurrence of frequency offset in the reference frequency signal generated by the TCXO 6, if the frequency offset of the reference frequency signal is with in a range, the phase error is corrected by the rotation correcting section 15 and normal modulation is made by the demodulating section 16.

However, at the conventional mobile station described above, if the frequency offset of the reference frequency signal exceeds the predetermined range, the frequency offset cannot be corrected by the AFC method. That is, the frequency offset may exceed the range being within the AFC.

Reasons why such phenomena as above occur in the conventional mobile station will be described below.

If carrier frequency offset occurs, phase is rotated in n-chip area being one symbol area. That is, phase error occurs among chips.

However, in the conventional reverse spreading device 7, the complex symbol is obtained by calculating the correlation value in a state in which all signals of n-pieces of chips in one symbol area are in phase. Because of this, the correlation value obtained by adding the correlation value of each chip to that of the spread code is made small, thus causing a decrease in spread gain. This also causes a probability of correct synchronization being a probability of getting spreading timing to be decreased in the timing detecting device 4. If the spreading timing cannot be obtained, not only reverse spreading by the reverse spreading device but also subsequent channel estimation and AFC process are made impossible as well.

Next, a state in which the probability of correct synchronization decreases with increase in the frequency offset is explained by referring to FIG. 17. FIG. 17 is a graph showing a relationship between the probability of correct synchronization and energy versus mean noise power spectrum density (Eb/N0) per one bit of a signal when an amount of a frequency offset of a carrier frequency is used in the conventional reverse spreading device.

It is apparent from the graph that, when the frequency offset is 0 (zero) ppm, the probability of correct synchronization does not decrease even if the Eb/N0 is decreased, while the probability of correct synchronization decreases when the frequency offset increases to become 3 ppm and 5 ppm. When the frequency offset becomes 5 ppm in particular, the probability of correct synchronization decreases rapidly.

Moreover, in the channel estimation by the channel estimating device 5 (FIG. 12), if spreading gain decreases, an error rate increases. In the conventional mobile station, since the channel estimation is performed based on symbol rate, if phase offset by over 180° per one symbol occurs, the spreading gain decreases greatly and the channel estimation in units of the symbol becomes very difficult. Furthermore, since detection in which direction the phase offset has occurred is impossible, the estimation of the frequency offset amount is also impossible. For example, when a reference frequency of the TCXO 6 is 2 GHz and the symbol rate is 16 Ksps (symbol/second), the offset of the reference frequency by 1 ppm causes phase error of 45°/symbol and offset of the reference frequency by 4 ppm causes the phase error of 180°/symbol.

FIG. 18 is a graph showing a relation between BER (Bit Error Rate) and Eb/N0 per one bit of a signal obtained when an amount of a frequency offset of a carrier frequency is used as a parameter in the conventional spreading device. As apparent from this graph, the BER obtained by the same Eb/N0 increases as the frequency offset increases from 0 ppm to 4 ppm.

Even in the case of the conventional examples described above, if the frequency offset of the TCXO 6 is within a range of ±4 ppm, since amount of the frequency offset can be detected, the offset of the frequency can be corrected by the AFC. This shows that actual range being within the AFC for the frequency offset is about ±4 ppm.

To solve the above problem, technology in which the range of the frequency offset being within the AFC for the frequency offset is expanded is disclosed in Japanese Patent Application Laid-open No. Hei9-200081. FIG. 19 is a schematic block diagram showing configurations of a frequency error detecting circuit containing other conventional reverse spreading devices.

The conventional frequency error detecting circuit is composed of complex matched filter 131 and complex matched filter 132, complex spread code generating device 133 and complex spread code generating device 134, peak detection averaging section 135 and peak detection averaging section 136, a peak position detecting section 137, power calculating section 138 and power calculating section 139, a normalizing circuit 141, a power difference calculating section 143 and a frequency error converting section 142. The power difference calculating section 143 includes an adder 140 and the normalizing circuit 141.

In the conventional frequency error detecting circuit, a base band complex signal is received by a radio section and undergoes quadrature detection and is input into the complex matched filter 131 and then is multiplied by a complex code generated by the complex spread code generating device 133 to produce a complex correlation value and another base band complex signal is also received by the radio section and undergoes quadrature detection and is input into the complex matched filter 132 at a same time and then is multiplied by a complex spread code generated by the complex spread code generating device 134 to produce the complex correlation value. Each of the produced correlation values is averaged by each of two peak detection averaging sections, peak detection averaging section 135 and peak detection averaging section 136, respectively with maximum timing of the complex correlation detected by the peak position detecting section 137 during several symbol times to calculate a power value by the two power calculating sections, power calculating section 138 and power calculating section 139. In the power difference calculating section 143, a difference of the calculated power values is computed by the adder 140 and the resulting difference of power values is normalized by the normalizing circuit 141. The frequency error converting section 142 calculates a corresponding frequency error from difference of a normalized power value and outputs it. The complex spread code generating device 133 outputs a complex spread code calculated in advance by being given a positive frequency offset and the complex spread code generating device 134 outputs a complex spread code calculated in advance by being given a negative frequency offset having a same absolute value as the positive frequency offset. This allows the frequency offset to be given to a complex correlation value within a symbol signal area.

In the conventional frequency error detecting circuit 6, by performing the reverse spreading using the complex spread code obtained by being given the frequency offset in advance, the range being within the AFC for the frequency error can be expanded. However, to achieve this, a memory used to store the complex spread code obtained by being given the frequency offset in advance is required. Moreover, a high speed chip rate processing is also required in which the base band signal can be multiplied by the spread code. In the conventional reverse spreading device as shown in FIG. 13 and FIG. 14, since the spread code is composed of one-bit signal, multiplication of the base band signal by the spread code is carried out actually by code operations.

However, since expression of the spread code obtained by being given the frequency offset requires increased number of bits and since the multiplication of the base band signal by the spread code cannot be achieved by such code operations, a multiplier is required by which signals composed of a plurality of bits can be multiplied by each other. Therefore, circuit scale and power consumption of the reverse spreading device used to do complex multiplication become much larger when compared with a case in which base band signal is multiplied by spread code containing no frequency offset. Such increased circuit scale and power consumption of the reverse spreading device are contradictory to recently increasing requirements for miniaturization and low power consumption in the mobile station such as a portable telephone or a like receiver/transceiver.

The conventional reverse spreading device and the AFC method described above have the following problems:

(1) The timing detection and channel estimation in large frequency offset environments cannot be performed only by the AFC method using the phase error obtained by channel estimation at the symbol rate, resulting in a narrow range being within the AFC for frequency error.

(2) Greatly increased circuit scale and power consumption of the reverse spreading device are inevitable in the AFC method disclosed in the Japanese Patent Application Laid-open No. Hei9-200081.

SUMMARY OF THE INVENTION

In view of the above, it is an object of the present invention to provide a reverse spreading device capable of performing timing detection and channel estimation even in a large frequency offset environment without great increase in its circuit scale and its power consumption and of expanding a range being within an AFC.

According to a first aspect of the present invention, there is provided a reverse spreading device for reversely spreading complex base band signals, one being composed of an I (In-phase signal) component and another being composed of a Q (Quadrature phase signal) component and each being spread using spread codes of n-pieces of chips for one symbol signal including:

a first correlator having first delay devices whose number is an integral multiple of n−1 and which sequentially shift the base band signal composed of the I component by delaying it at a predetermined time interval, having n-pieces of first multipliers each performing a multiplication between the base band signal composed of the I component shifted by the first delay devices and a spread code and having m-pieces of first adders each performing integration of an output from k-pieces of the first multipliers out of n-pieces of the first multipliers and outputting the result of the integration as an intermediate signal composed of the I component (m=n/k);

a second correlator having second delay devices whose number is the same as that of chips for one symbol signal sequentially shifted by delaying the base band signal composed of the Q component at a predetermined time interval, having n-pieces of second multipliers each performing a multiplication between the base band signal composed of the I component sequentially shifted by the second delay devices and the spread code and having m-pieces of second adders each performing integration of an output from k-pieces of the first multipliers out of n-pieces of the first multipliers and outputting the result of the integration as an intermediate signal composed of the Q component;

m-pieces of phase rotators each performing a rotation correction by phase-rotating m-pieces of the intermediate signals each being composed of the I component produced by each of the first correlator and m-pairs of complex intermediate signals containing m-pieces of intermediate signals composed of the Q component produced by each of the second correlator, on a complex plane at a phase rotation angle at m-stages each being slid by a reference rotation angle for every pair of complex intermediate signals;

a first adder to perform calculation of a correlation value composed of the I component by doing integration of the I component of m-pieces of complex intermediate signals obtained after the rotation correction is made by each of the phase rotators; and a second adder to perform calculation of a correlation value composed of the Q component by doing integration of the Q component of m-pieces of complex intermediate signals obtained after the rotation correction of each of the phase rotators is made.

In the reverse spreading device of this invention, a digital matched filter type correlator is used, a multiplication is made between the complex base band signals and spread code by the first and second multipliers and m-pieces of complex intermediate signals by integrating k-pieces of multiplied values obtained by the first and second adders before complex symbols are obtained by multiplying n-pieces of the multiplied values and a frequency offset is provided to m-pieces of complex intermediate signals by the phase rotators. As a result, a rotation during one symbol period is compensated for and a great spread gain can be obtained.

According to a second aspect of the present invention, there is provided a reverse spreading device for reversely spreading complex base band signals, one being composed of an I (In-phase signal) component and another being composed of a Q (Quadrature phase signal) component and each being spread using spread codes of n-pieces of chips for one symbol signal including:

a first multiplier to sequentially perform a multiplication between base band signals composed of the I component and spread codes of n-pieces of chips;

a first correlator to produce m-pieces of intermediate signals composed of the I component by sequentially integrating a multiplied value obtained by the first multiplier for every k-pieces and by using the multiplied value as the intermediate signal and to output them as (m=n/k);

a second multiplier to sequentially perform a multiplication between base band signals composed of the Q component and spread codes of n-pieces of chips;

a second correlator to produce m-pieces of intermediate signals composed of the Q component by sequentially integrating the multiplied value obtained by the first multiplier for every k-pieces multiplied values and by using the multiplied value as intermediate signals and to output them;

a phase rotator to perform a rotation correction by phase-rotating m-pieces of complex intermediate signals containing the intermediate signal composed of the I component and the intermediate signal each composed of the Q component on a complex plane at a phase rotation angle at m-stages each being slid by a reference rotation angle for every pair of complex intermediate signals;

a first adder to perform calculation of a correlation value composed of the I component by doing integration of the I component of m-pieces of complex intermediate signals obtained after the rotation correction by each of the phase rotators is made; and a second adder to perform calculation of a correlation value composed of the Q component by doing integration of the Q component of m-pieces of complex intermediate signals obtained after the rotation correction by each of the phase rotators is made.

In the reverse spreading device of this invention, a sliding correlator is used, a multiplication is sequentially made between the complex base band signal and spread codes by the first and second multiplier, m-pieces of complex intermediate signals are produced by performing integration of k-pieces of multiplied values before complex symbols are obtained by multiplication of n-pieces of multiplied values and a frequency offset is sequentially provided to m-pieces of complex intermediate signals. As a result, a rotation during one symbol period is compensated for and a great spread gain can be obtained. Therefore, since a probability of correct synchronization is increased by the great spread gain and the phase error is corrected before production of a complex symbol, range being within AFC can be expanded.

According to a third aspect of the present invention, there is provided a reverse spreading device for reversely spreading complex base band signals, one being composed of an I (In-phase signal) component and another being composed of a Q (Quadrature phase signal) component and each being spread using spread codes of n-pieces of chips for one symbol signal including:

a frequency error correcting device to count the number of chips of the complex base band signals to be inputted and to perform a rotation correction in a step-by-step manner by rotating a phase of the complex band signals on a complex plane at a phase rotation angle at m-stages each being slid by a reference rotation angle being an angle obtained by dividing a rotation angle ($2\pi$) of a revolution to M portions every time the number of the chips increases by K-chip;

a spread code multiplier to multiply each of complex base band signals obtained after the rotation correction by the frequency error correcting device is made, by spread codes; and two accumulative adders to produce a correlation value composed of the I component and a correlation value composed of the Q component by performing accumulative addition of a multiplied value from the spread code multiplier for one symbol period for each of the I component or Q component;

In the foregoing, a preferable mode is one wherein the frequency error correcting device is composed of a chip number counter to sequentially count the number of chips of the complex base band signals to be inputted and to provide an instruction for incrementing every time when the number of chips increases by K-chips, of a step number counter to increase the step number by one if the outputted step number is a number other than M−1 and to return the step number to 0 if the step number is M−1 in accordance with the instruction for incrementing fed from the chip number counter and of a phase rotator to perform a rotation correction by rotating a phase of the complex base band signal at a phase rotation angle corresponding to a step number fed from the step number counter, out of phase rotation angles at M stages slid by the reference rotation angle.

In the reverse spreading device of the present invention, since the phase rotation correction is carried out prior to the reverse spreading processing, no change in the conventional reverse spreading processing is required for the reverse spreading processing at a latter stage, thus providing a freedom in configuring the correlator. Moreover, since the reverse spreading device requires only one phase rotator and only one stage for the accumulative adding processing, it can be constructed to have a simple circuit configuration. Furthermore, since the rotation correction processing is made prior to the reverse spreading processing, the correction processing unit can be set independently of symbol spreading rate.

According to a fourth aspect of the present invention, there is provided a timing detecting device comprising the reverse spreading device described above and a peak detecting circuit to detect spreading timing based on sizes of correlation values of the I component and Q component obtained by reverse spreading in the reverse spreading device.

In the timing detecting device of the present invention, since a great gain can be obtained by a correlation value calculated by the reverse spreading device described above, probability of correct synchronization can be improved.

According to a fifth aspect of the present invention, there is provided a channel estimating device comprising the reverse spreading device described above and a rotation correcting circuit to detect a phase error contained in a complex symbol obtained by the reverse spreading device and to perform correction of the phase error.

In the channel estimation device of the present invention, since the complex symbol is produced by using the reverse spreading device described above, a phase error can be corrected to some extent before production of the complex symbol. Therefore, even phase error is large, the phase error can be corrected by an AFC method, thus allowing expansion of range within the AFC.

According to a sixth aspect of the present invention, there is provided a method for measuring a frequency error being a difference between a reference frequency of a receiver and a reference frequency of a sender including steps of:

shifting sequentially a base band signal composed of an I (In-phase signal) component and a base band signal composed of a Q (Quadrature phase signal) component and performing a multiplication between shifted base band signals each being composed of the I component or the Q component;

performing integration of k-pieces of multiplied values out of n-pieces of multiplied values obtained and producing m-pieces of intermediate signals composed of an I component (m=n/k);

performing a rotation correction by rotating phases of m-pairs of complex intermediate signals including m-pieces of intermediate signals composed of the I component and m-pieces of intermediate signals composed of the Q component at a phase rotation angle at m-stages each being slid by a reference rotation angle for every one pair of complex intermediate signals;

calculating a correlation value of the I component and a correlation value of the Q component by integrating the I component and Q component of m-pieces of complex intermediate signals obtained after the rotation correction is made; and calculating a power value of a complex symbol based on the correlation values of the I component and the Q component and selecting the reference rotation angle so that the power value becomes maximum and then detecting the frequency error based on the reference rotation angle selected.

According to a seventh aspect of the present invention, there is provided a method for measuring a frequency error being a difference between a reference frequency of a receiver and a reference frequency of a sender including steps of:

performing a multiplication between base band signals, one being composed of an I component of n-pieces of chips and another being composed of Q component of n-pieces of chips and spread code of n-pieces of chips and producing m-pieces of intermediate signals, one being composed of the I component and the Q component by integrating a multiplied value for every k-pieces of the multiplied value to use the integrated value as an intermediate signal (m=n/k);

performing a rotation correction by rotating phases of m-pairs of complex intermediate signals including m-pieces of intermediate signals composed of the I component and m-pieces of intermediate signals composed of the Q component at a phase rotation angle at m-stages each being slid by a reference rotation angle for every one pair of complex intermediate signals;

calculating a correlation value of the I component and a correlation value of the Q component by integrating the I component and Q component of m-pieces of complex intermediate signals obtained after the rotation correction is made; and calculating a power value of the complex symbol based on the correlation values of the I component and the Q component and selecting the reference rotation angle so that the power value becomes maximum and then detecting the frequency error based on the reference rotation angle selected.

According to an eighth aspect of the present invention, there is provided a method for measuring a frequency error being a difference between a reference frequency of a receiver and a reference frequency of a sender including steps of:

counting the number of chips of a complex base band signals are to be inputted;

performing a rotation correction in a step-by-step manner by rotating a phase of the complex band signals on a complex plane at a phase rotation angle at m-stages each being slid by a reference rotation angle being an angle obtained by dividing a rotation angle ($2\pi$) of a revolution to M portions every time a counted number of the chips increases by K-chip;

multiplying complex base band signals by spread signals obtained after the rotation correction is made by the frequency error correcting device;

producing a correlation value of an I component and a correlation value of a Q component by adding the multiplied value fed from a spread code multiplier in an accumulative manner for every I component and every Q component during one symbol period; and calculating a power value of the complex symbol based on the correlation values of the I component and the Q component and selecting the reference rotation angle so that the power value becomes maximum and then detecting the frequency error based on the reference rotation angle selected.

According to a ninth aspect of the present invention, there is provided an AFC (Automatic Frequency Control) method to control a frequency of a reference frequency signal of a mobile station so that a frequency error measured by the frequency error measuring method described above.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
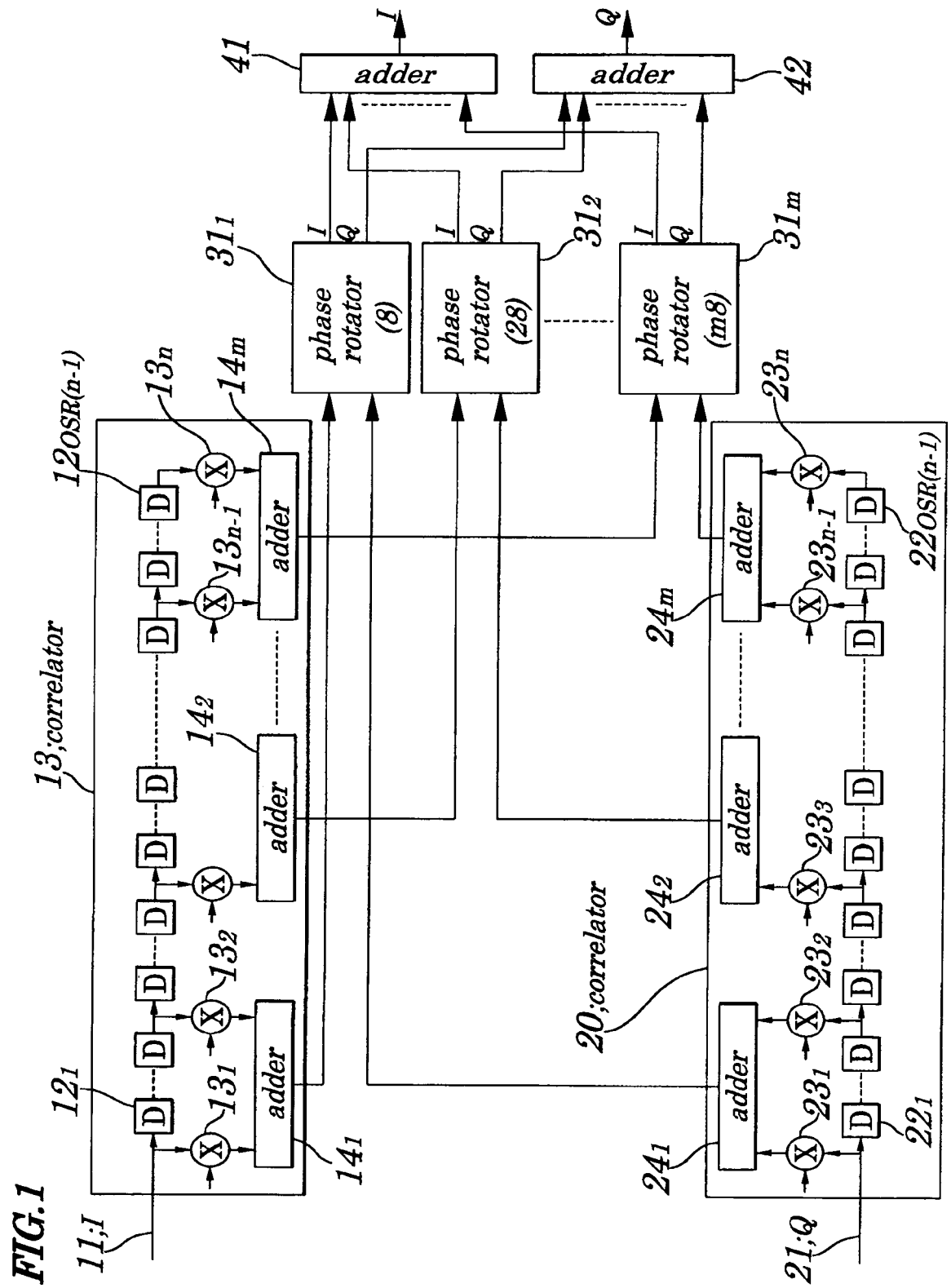
FIG. 1 is a schematic block diagram showing configurations of a reverse spreading device according to a first embodiment of the present invention.

FIG. 1 is a schematic block diagram showing configurations of a reverse spreading device according to a first embodiment of the present invention. The same reference numbers in FIG. 1 as shown in FIG. 13 designate corresponding parts. According to this embodiment, a reverse spreading device shown in FIG. 1 is used as a reverse spreading device 7 and a reverse spreading device 9 in a mobile station in FIG. 12. In description, it is assumed that, in a CDMA (Code Division Multiple Access) communication system, one symbol signal is spread by spread codes of n-pieces of chips.

As shown in FIG. 1, the reverse spreading device of the embodiment is chiefly composed of correlators 10 and 20, phase rotators $31_1$ to $31_m$ and adders 41 and 42. The character "m" represents a division number used to divide "n" by k chips and the relationships among "n", "m" and "k" are represented by a formula "n=m×k".

Moreover, the correlator 10 is composed of m-pieces of adders $14_1$ to $14_m$, n-pieces of multipliers $13_1$ to $13_n$ and OSR x (n−1) pieces of delay devices $12_1$ to $12_{OSR(n-1)}$. The correlator 20 is composed of m-pieces of adders $24_1$ to $24_m$, n-pieces of multipliers $23_1$ to $23_n$ and OSRx (n−1) pieces of delay devices $22_1$ to $22_{OSR(n-1)}$.

The adders $14_1$ to $14_m$ are adapted to produce an intermediate signal having 1/k chip rate by integrating values fed from k-pieces of the multipliers out of the multipliers $13_1$ to $13_n$. For example, the adder $14_1$ operates to integrate values from the multipliers $13_1$ to $13_k$ and to output them. Each of the adders $24_1$ to $24_m$ operate to integrate a value from each of k-pieces of the multipliers out of the multipliers $23_1$ to $23_n$.

When a concrete value is substituted for each of characters "n", "m" and "k", if a value 256, for example, is substituted for the character "n", that is, if one symbol is spread to be 256 chips and the character "m" being a number used to divide the 256 chips is 4, the number of chips "k" for each divided unit is 64 chips.

Each of the phase rotators $31_1$ to $31_m$ is adapted to rotate each of phases of m-pieces of intermediate signals obtained by the adders $14_1$ to $14_m$ and having a 1/k chip rate, by phase rotation angles δ, 2δ, 3δ, ..., mδ at an "m" stage where the phase rotators $31_1$ to $31_m$ are slid by a reference rotation angle δ on a complex plane and then outputs them. Each of the adders 41 and 42 is an m-tap input adder which is operated to integrate the intermediate signal whose phase is rotated by the phase rotators $31_1$ to $31_m$, for every I component and every Q component, to obtain a correlation value of a complex symbol. The obtained complex symbol at this point, since its phase is rotated by the phase rotators $31_1$ to $31_m$ and as a result, a frequency offset is given in a pseudo-manner, becomes a reversely spread complex symbol.

By setting a reference rotation angle δ of the intermediate signal rotated by the chase rotators $31_1$ to $31_m$ to several sizes, the frequency offset to be given to the complex symbol can be changed. Then, a power value of the complex symbol which has been given the frequency offset is calculated and the frequency offset to be given based on the phase rotation angle at which the obtained power value has become maximum is the frequency offset being nearest to a frequency error between a sender and a receiver.

Then, the phase rotators $31_1$ to $31_m$ perform the phase rotation of the intermediate signal based on the phase rotation angle at which the power value of the complex symbol has becomes maximum. Moreover, it is not necessary that precision of the frequency offset given by the phase rotation performed by the phase rotators $31_1$ to $31_m$ is so high that a frequency deviation at both the sender and the receiver conform completely to each other and, therefore, if the frequency offset is within a range allowing channel estimation to be carried out by a channel estimating device 5 (FIG. 12), the frequency offset is corrected by a conventional AFC method.

If the number "m" for dividing the number "n" being the number of chips used for one symbol signal is made larger, though circuit scale is made larger, it is possible to obtain a great spread gain, to improve probability of correct synchronization and to reduce a BER. Therefore, a value of the division number "m" is the value to be decided after taking a required performance and an allowable circuit scale or a like into consideration.

Data are shown in FIGS. 2 to 6, on characteristics of the reverse spreading device obtained at the mobile station according to the first embodiment, which have been obtained by performing a simulation, using a base station signal generating simulator which can generate the frequency offset occurring between the base station and the mobile station. The simulation is performed under conditions that the number of symbols per one frame is 160 (symbol/frame) for the I and Q components respectively and that carrier frequency is 2 GHz.

Figure 2:
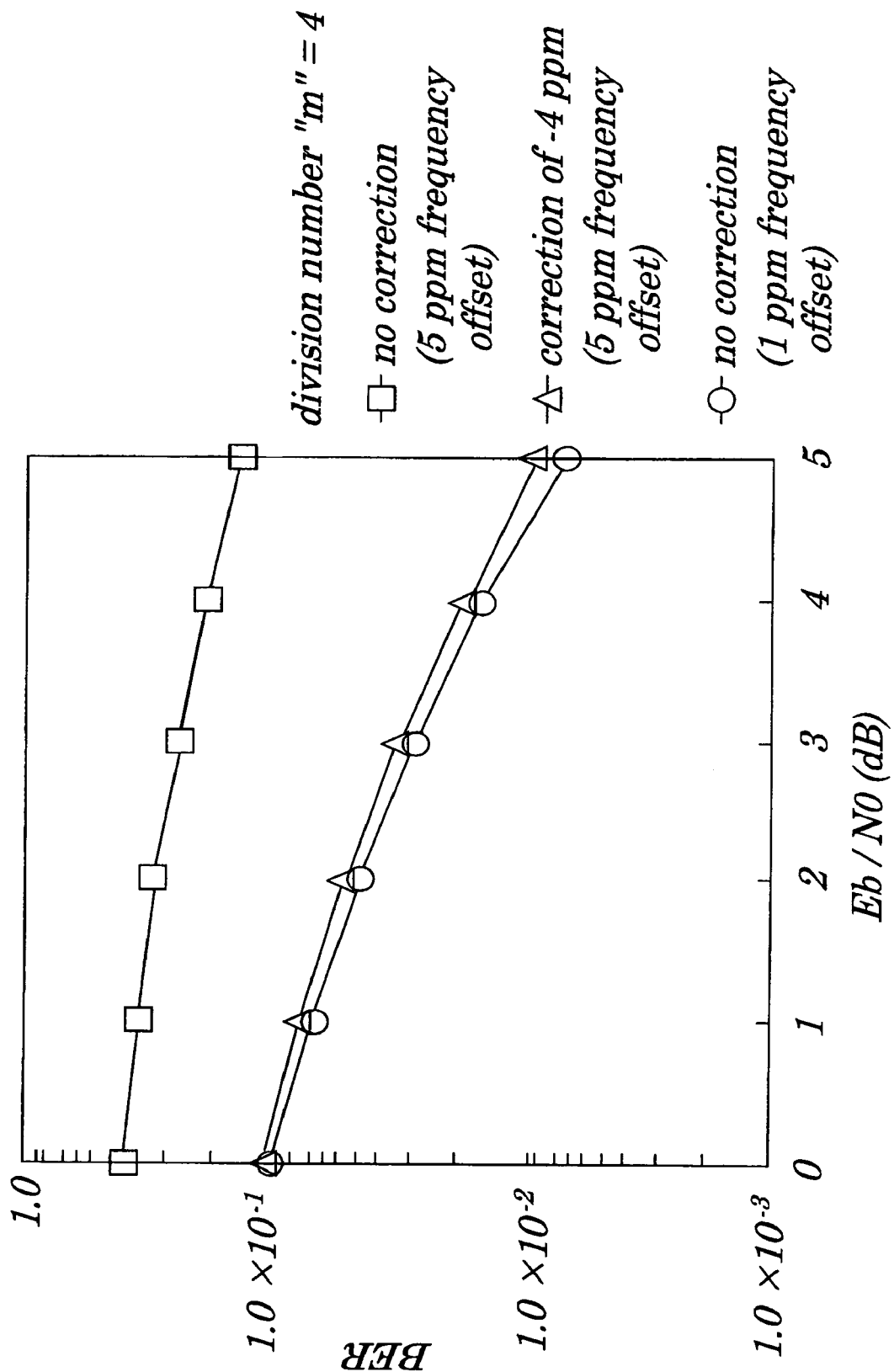
FIG. 2 is a graph showing a bit error rate (BER) characteristic of the reverse spreading device of the first embodiment in a case of a division number "m" being "4"

FIG. 2 shows the BER characteristic obtained in a case in which a frequency offset of 5 ppm for the 2 GHz carrier frequency is generated and is corrected by −4 ppm using the reverse spreading device of the first embodiment, in a case in which the frequency offset is not corrected and in a comparison case in which a frequency offset of only 1 ppm is generated and not corrected. The BER is a bit error rate in data obtained after QPSK (Quadrature Phase Shift Keying) demodulation.

It is apparent from FIG. 2 that the BER characteristic is greatly improved by the correction in the case of the occurrence of the 5 ppm frequency offset. FIG. 2 is indicative that, even in the case of the 5 ppm frequency offset, by performing the −4 ppm correction, the BER characteristic being almost equal to that in the case of the 1 ppm frequency offset can be obtained.

Figure 3:
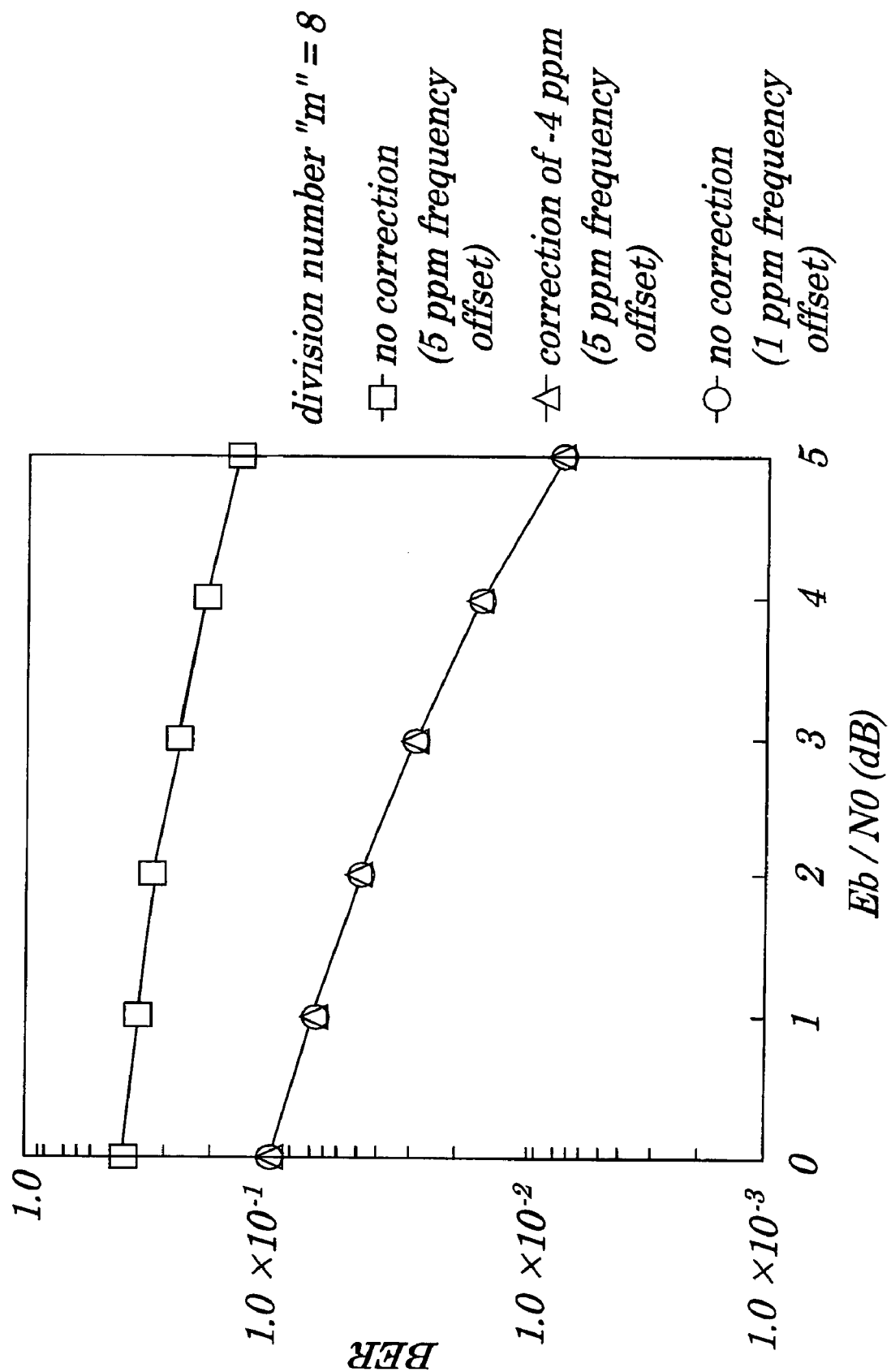
FIG. 3 is a graph showing the BER characteristic of the reverse spreading device of the first embodiment in the case of the division number "m" being 16.

FIG. 3 is a graph showing the BER characteristic of the reverse spreading device of the first embodiment in the case of the division number "m" being increased to 8 under the same condition given in FIG. 2. It is apparent from FIG. 3 that, even in the case of the 5 ppm frequency offset, by performing the −4 ppm correction, the BER characteristic being almost equal to that in the case of the 1 ppm frequency offset can be obtained.

Figure 4:
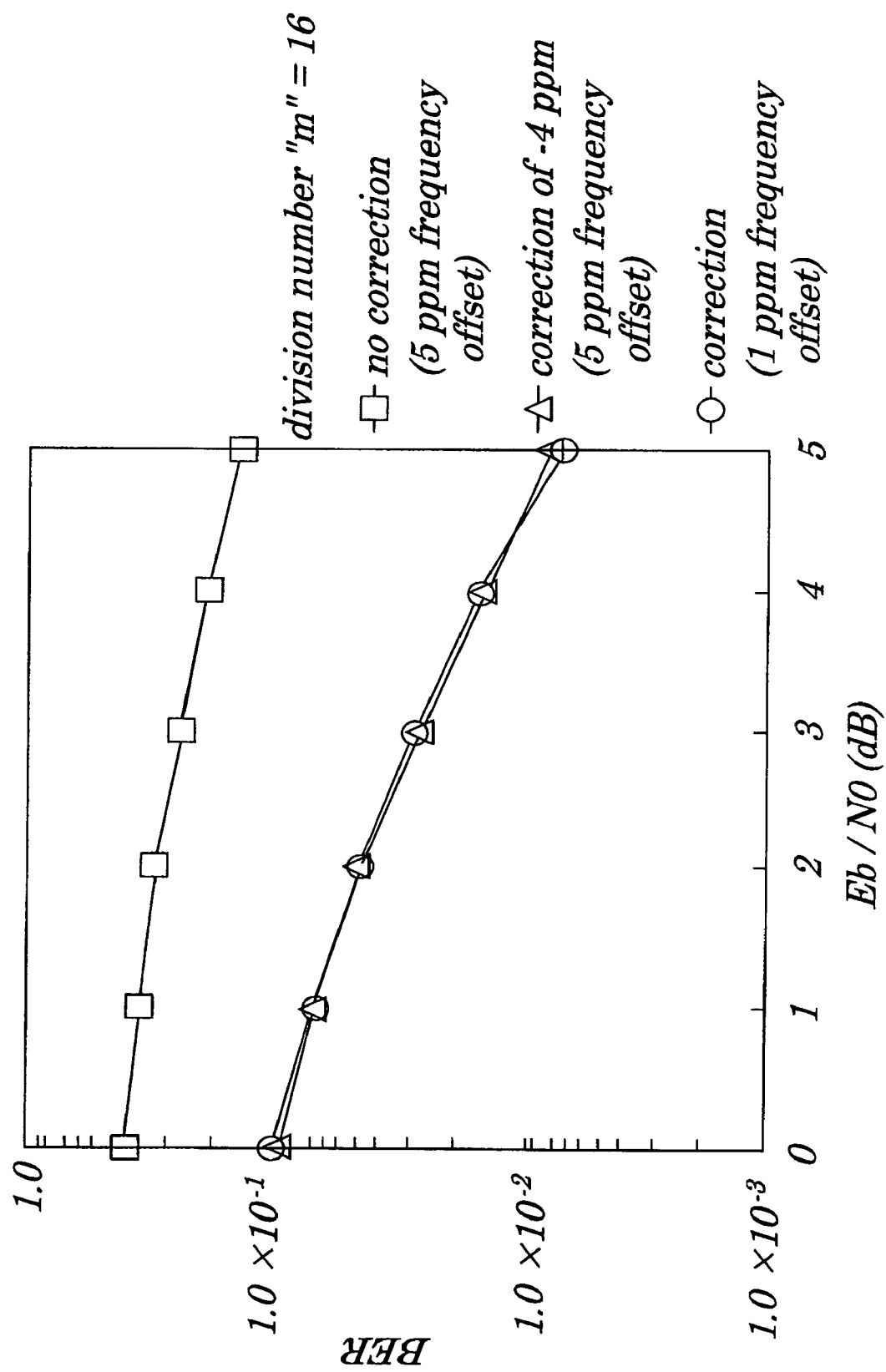
FIG. 4 is a graph showing the BER characteristic of the reverse spreading device of the first embodiment in the case of the division number "m" being 8.

FIG. 4 is a graph showing the BER characteristic of the reverse spreading device of the first embodiment in the case of the division number "m" being increased from 4 to 16 under the same conditions given, in FIG. 2. It is also apparent from FIG. 4 that, even in the case of the 5 ppm frequency offset, by performing the −4 ppm correction, the BER characteristic being almost equal to that in the case of the 1 ppm frequency offset can be obtained.

Figure 5:
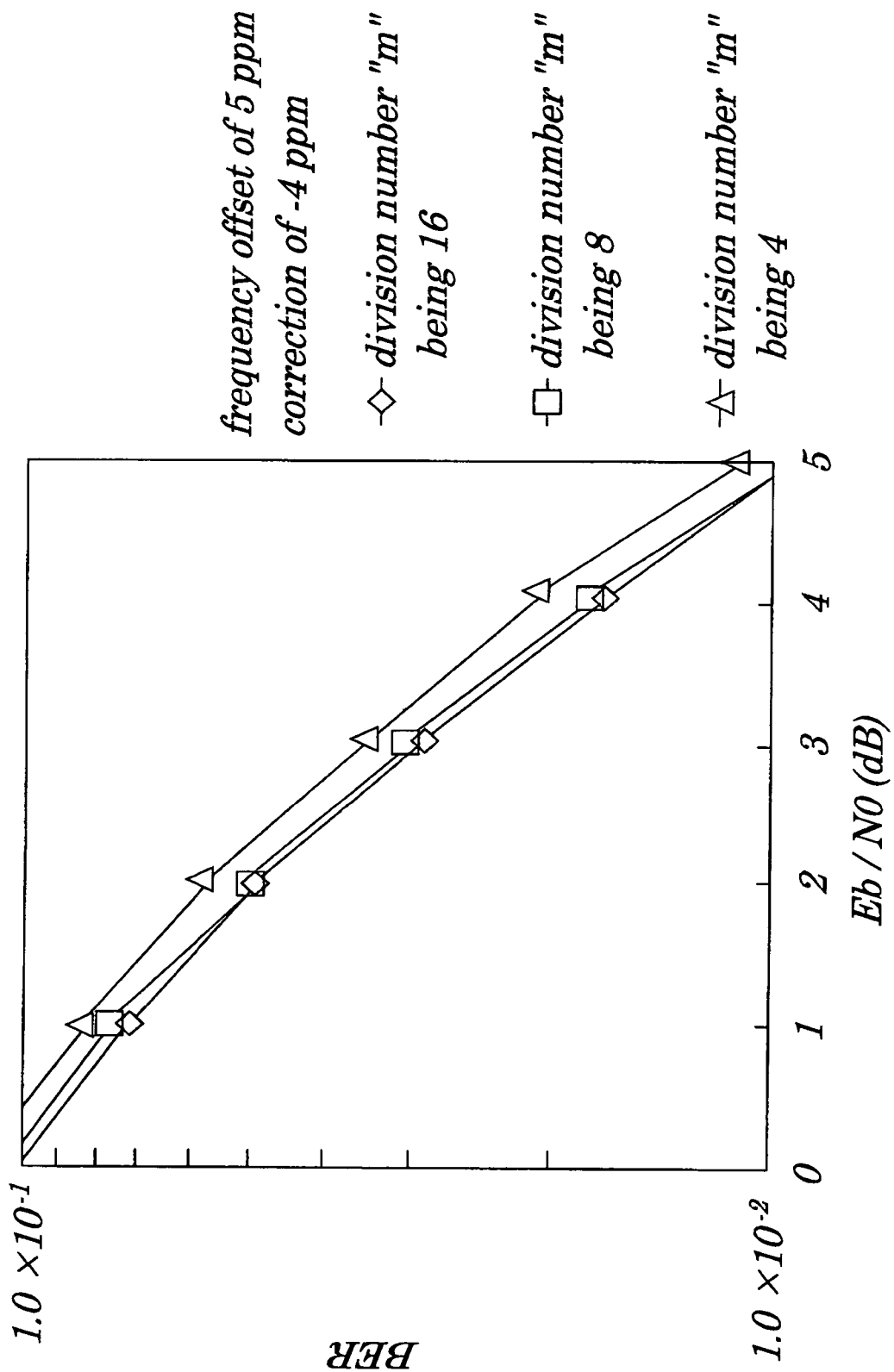
FIG. 5 is a graph showing the BER characteristic of the reverse spreading device of the first embodiment in the case of the division number "m" being 4, 8 and 16 respectively.

FIG. 5 is a graph showing a relationship between the BER and the Eb/N0 in the case of the division number being 4, 8 and 16 respectively and it is apparent that the BER is improved by increasing the division number "m".

Figure 6:
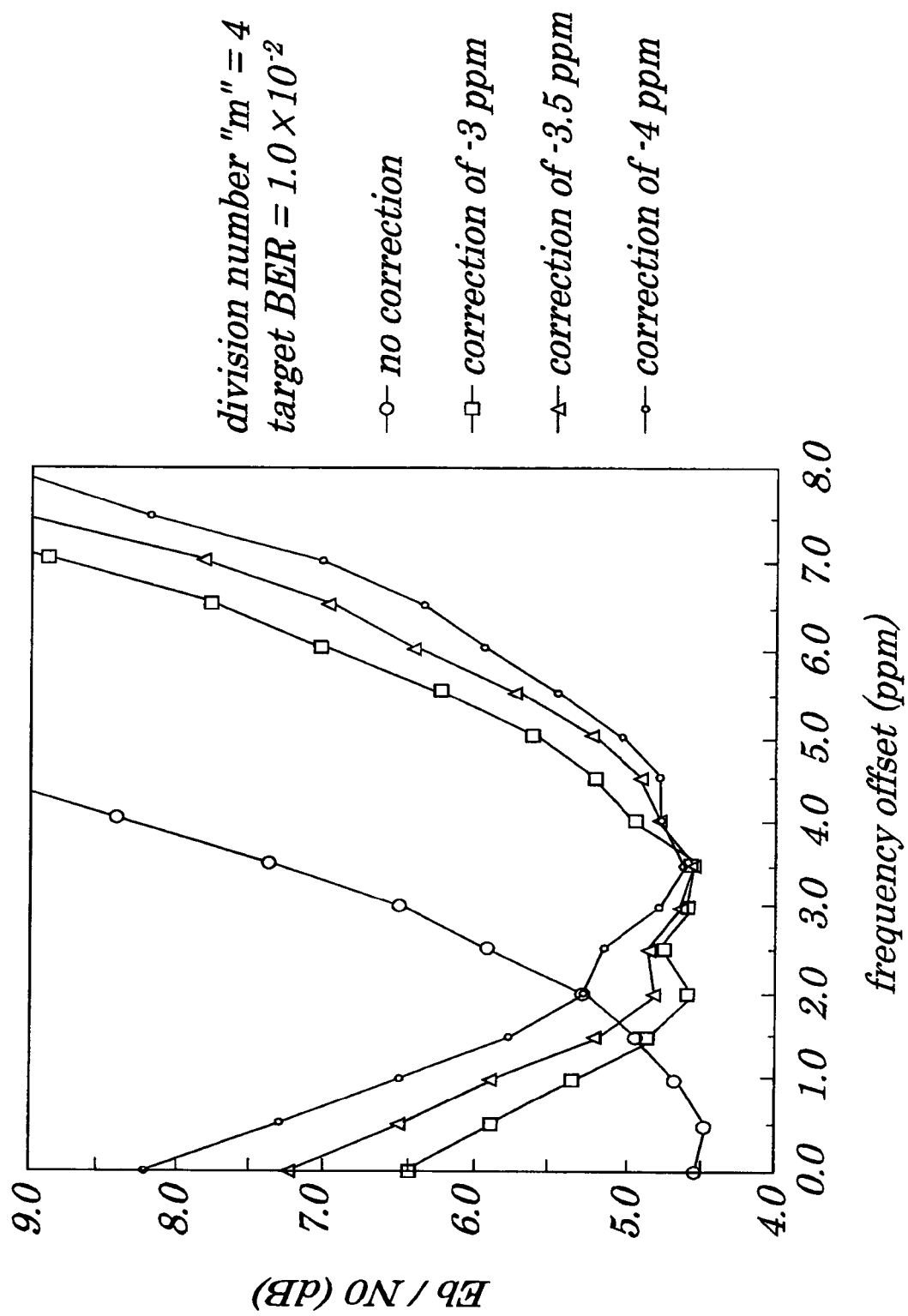
FIG. 6 is a graph showing a seizure characteristic obtained by the reverse spreading device of the first embodiment in the case of the division number "m" being 4.

FIG. 6 is a graph showing changes of the Eb/N0 required for obtaining a targeted BER for the frequency offset in a case in which the targeted BER is set to $1.0 \times 10^{-2}$ in the reverse spreading device according to the first embodiment. This simulation is made in the case of the division number "m" being 4. The graph in FIG. 6 is indicative that, when the correction is not made, if the frequency offset exceeds 4 ppm, the Eb/N0 required to obtain the targeted EBR is increased rapidly, while, when the correction according to this embodiment is made, the modulation can be achieved even in an environment in which the frequency error is large and noise is high. As a result, the range being within the AFC for the frequency error is expanded.

In the conventional technology, it is possible to exercise the AFC until the frequency offset becomes ±4 ppm. According to the embodiment of the present invention, the AFC is made possible until the frequency offset becomes ±7 ppm.

Figure 12:
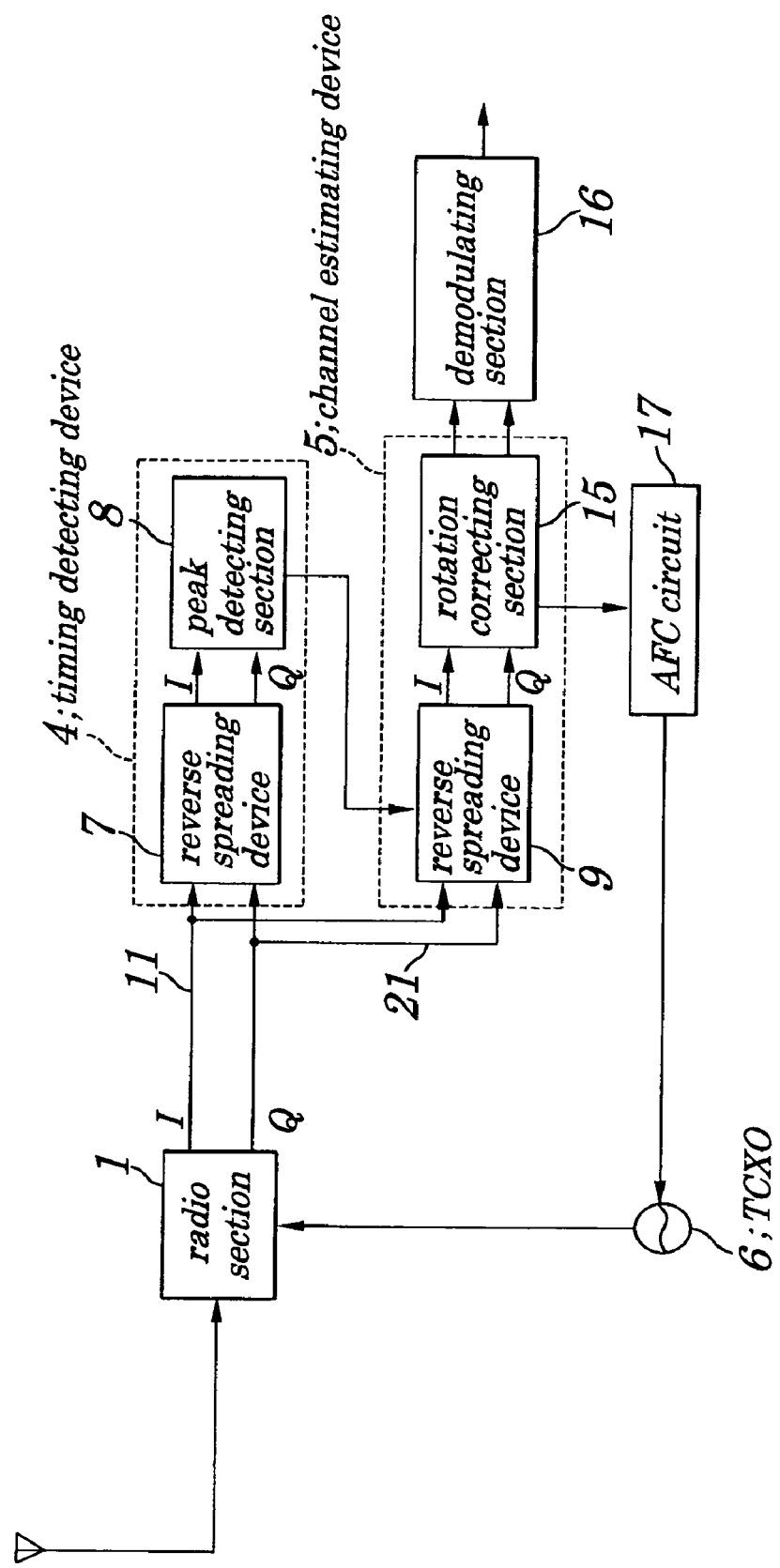
FIG. 12 is a schematic block diagram showing configurations of a conventional mobile station in which an AFC is made.
Figure 13:
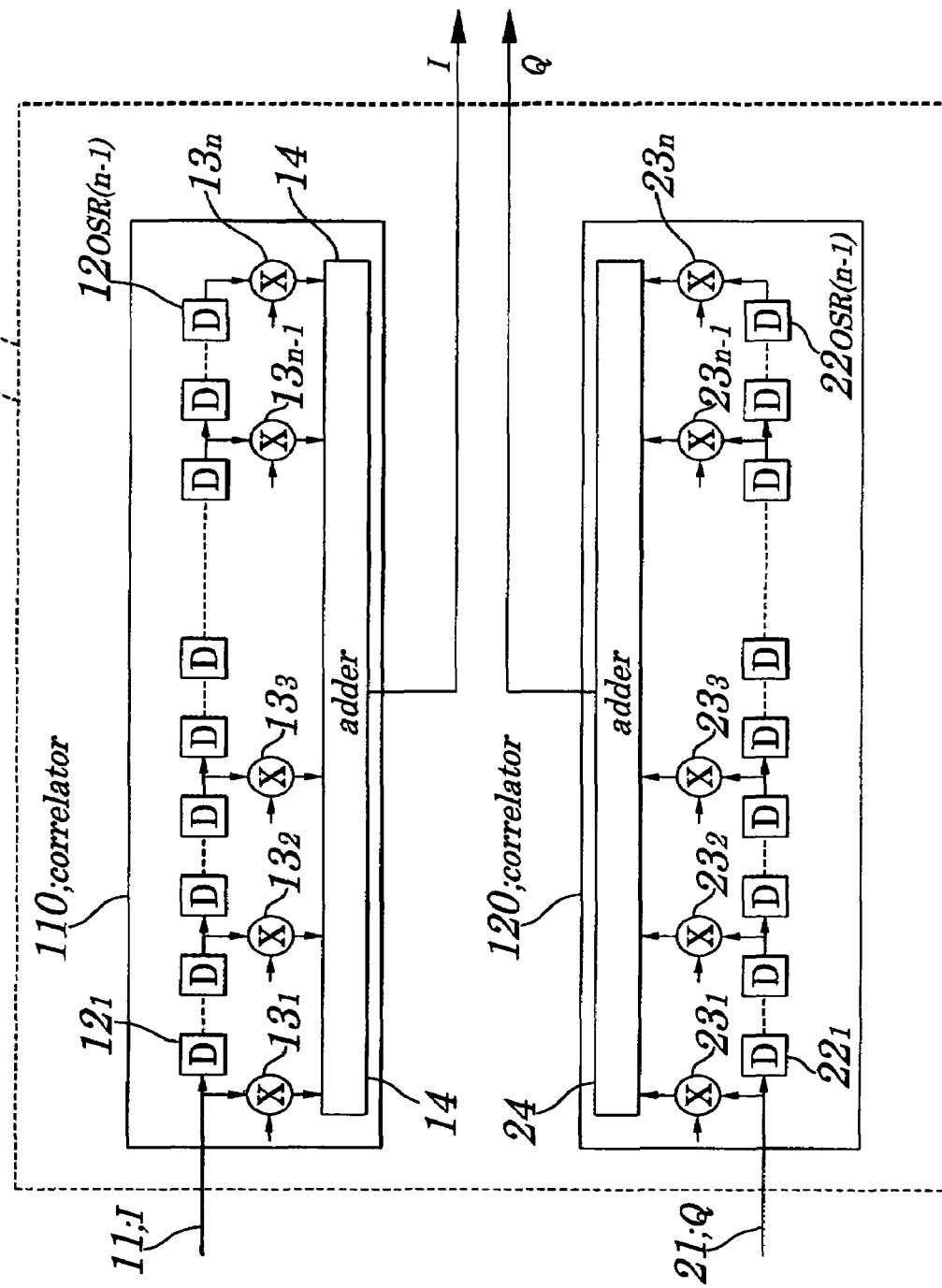
FIG. 13 is a schematic block diagram showing configurations of conventional reverse spreading devices as shown in FIG. 12 which are implemented by using digital matched filters.

In the embodiment described above, the present invention is applied to a reverse spreading device 7 embedded in a timing detecting device 4 and to a reverse spreading device 9 embedded in the channel estimating device 5 in FIG. 12, however, the present invention is not limited to those in the embodiment, that is, the present invention may be applied to only either of the reverse spreading device 7 and the reverse spreading device 9, which may be used in common for the reverse spreading device 7 and the reverse spreading device 9.

Furthermore, since, in the reverse spreading device 9 embedded in the channel estimation device 5, it is necessary to calculate an original complex symbol by detecting the phase error through the channel estimation after the phase rotation, a highly precise phase correction is required. However, in the reverse spreading device 7 adapted to perform the correct synchronization, all that must be done is to detect a size of the correlation value in one symbol area and, therefore, precision of the phase correction may be lower compared with the case of the reverse spreading device 9.

Second Embodiment

Figure 7:
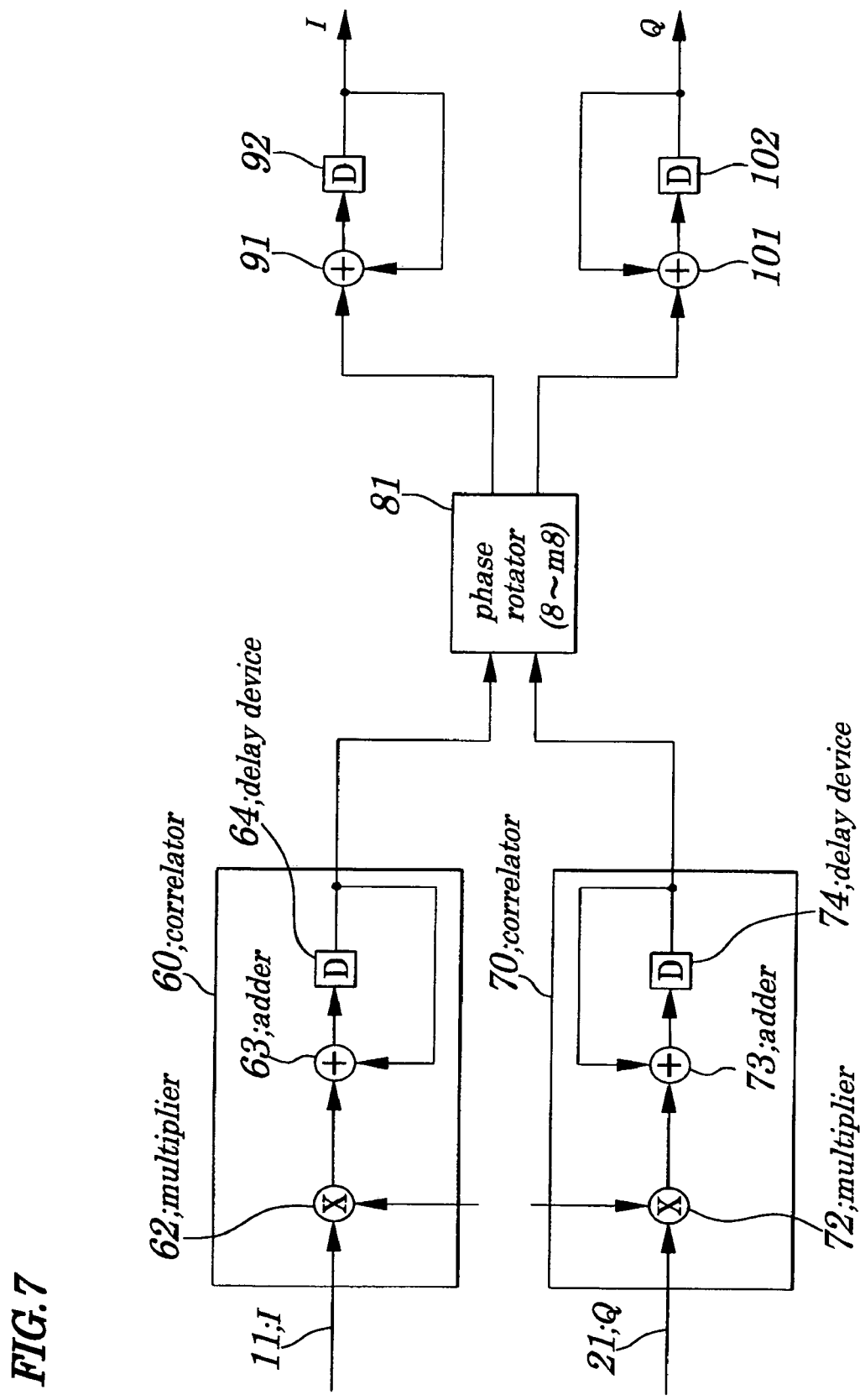
FIG. 7 is a schematic block diagram showing configurations of a reverse spreading device according to a second embodiment of the present invention.
Figure 14:
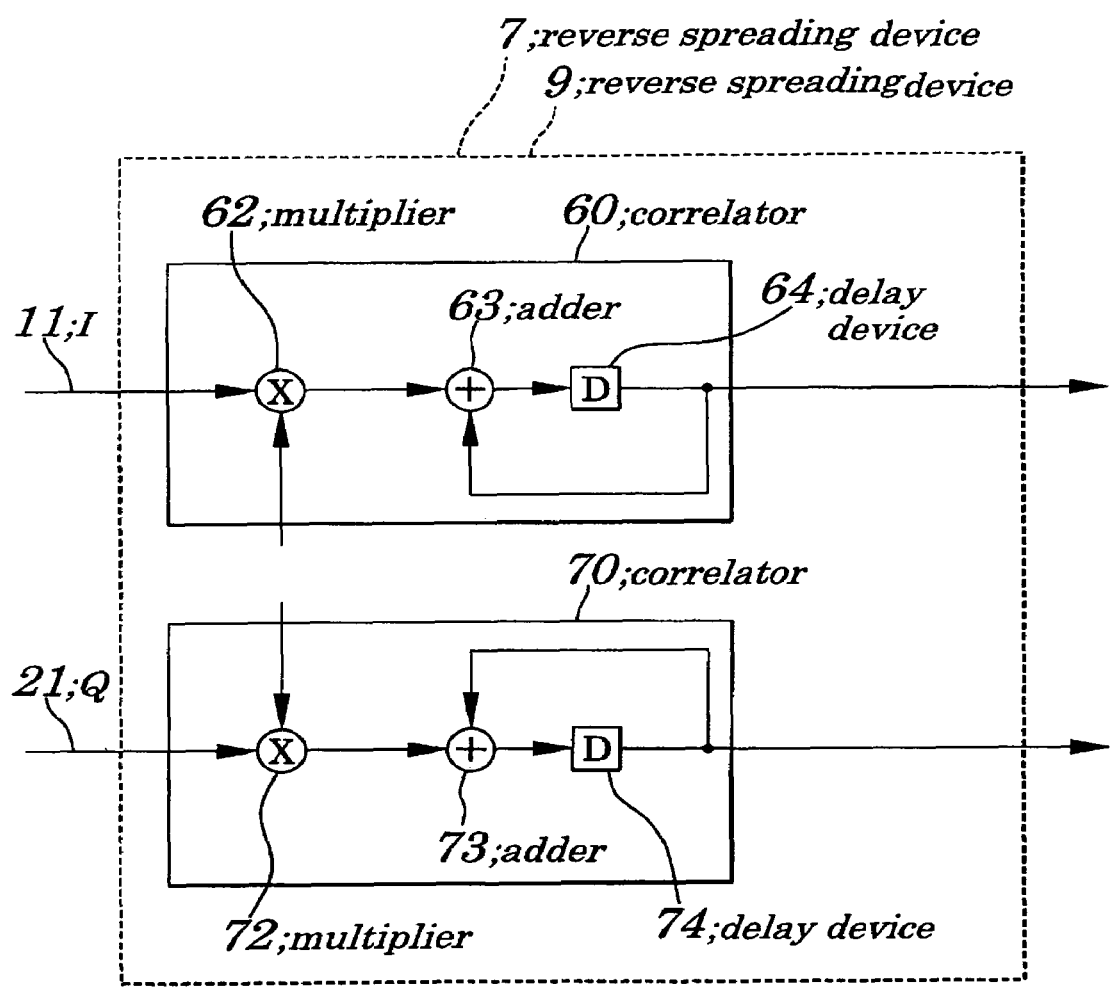
FIG. 14 a schematic block diagram showing configurations of the conventional reverse spreading devices as shown in FIG. 12 which are implemented by using sliding correlators.
Figure 15:
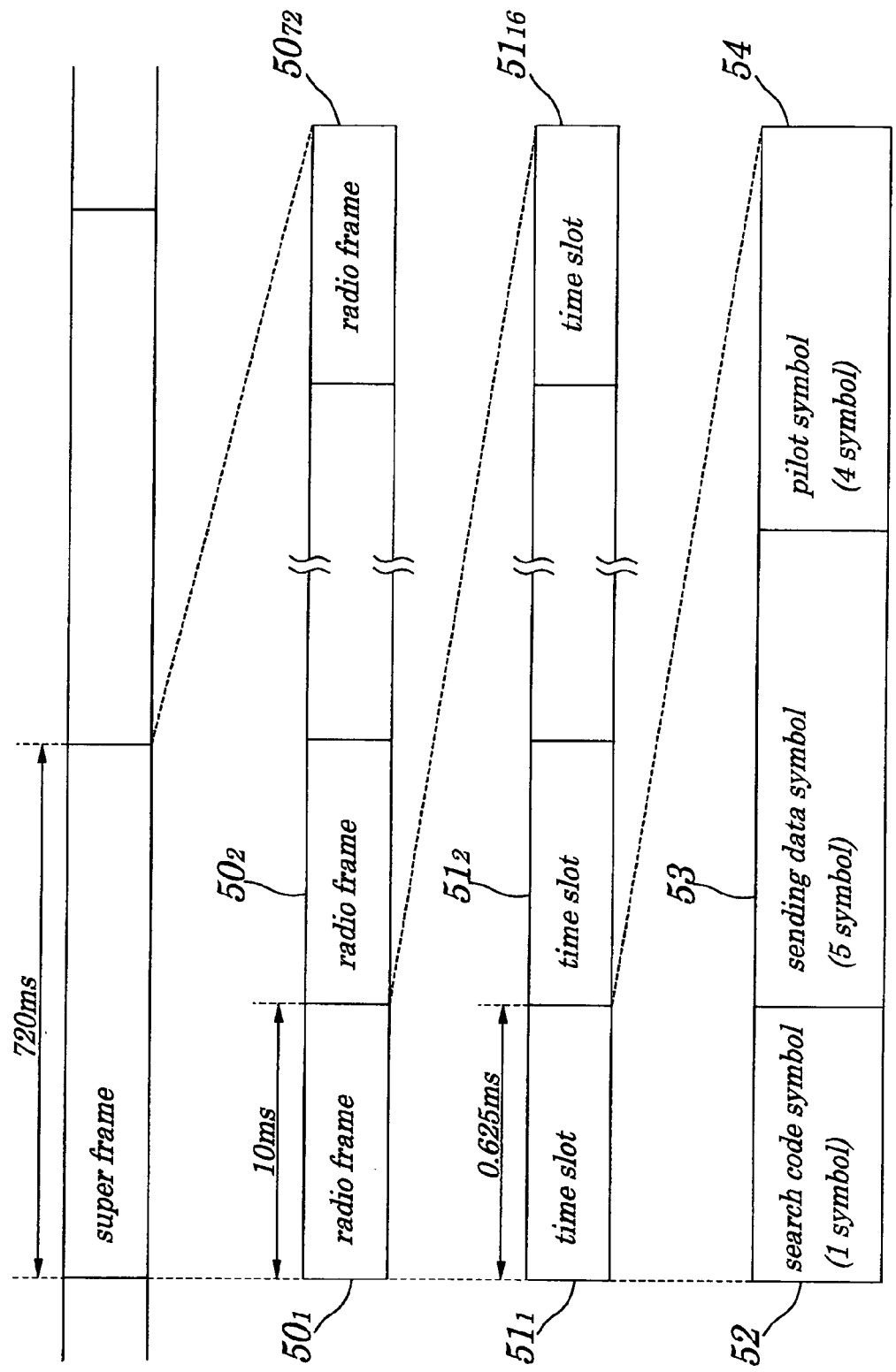
FIG. 15 is a diagram showing frame configurations of a conventional perch channel.
Figure 16:
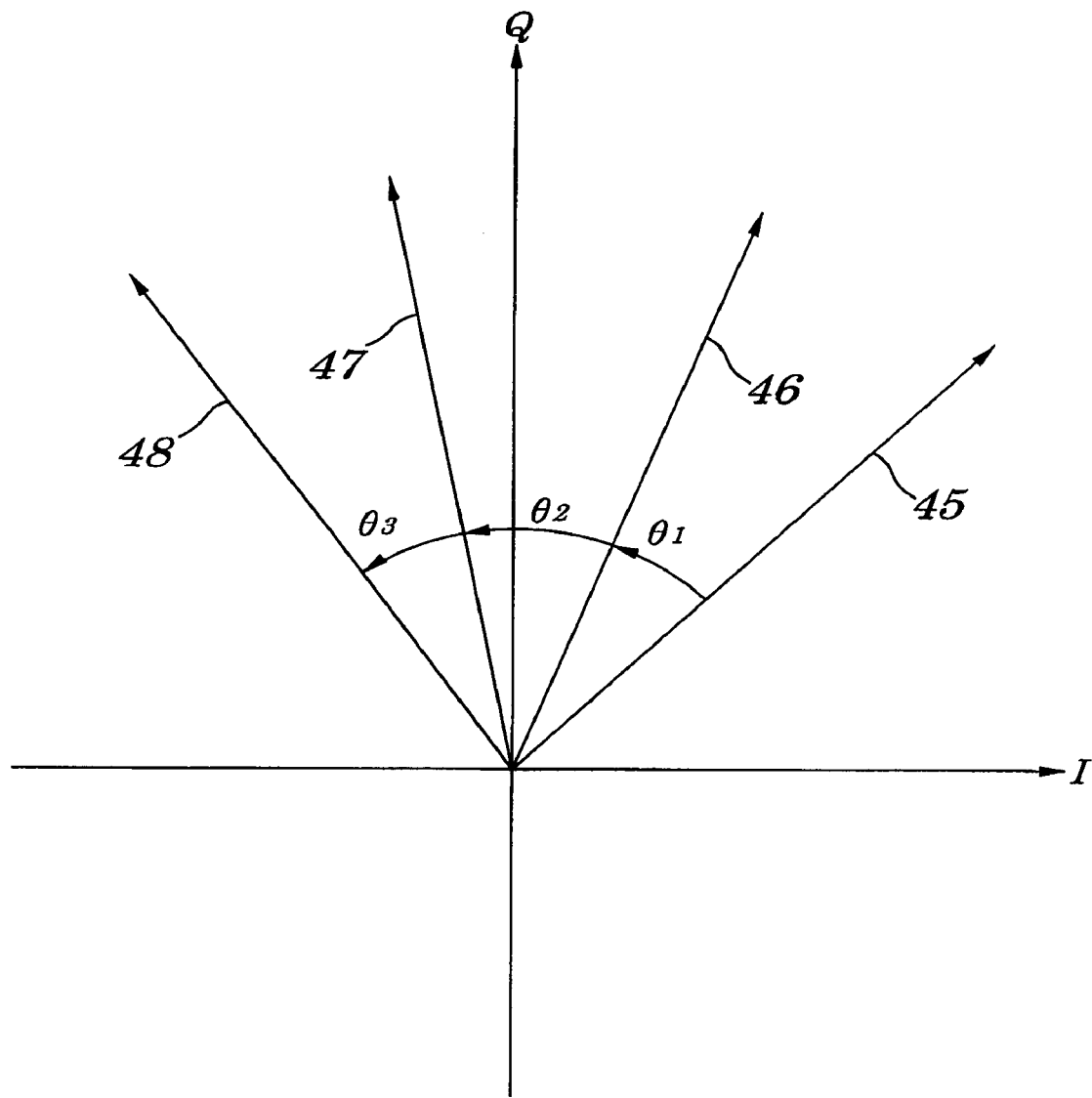
FIG. 16 is a diagram showing a rotation of a phase of a conventional pilot symbol.
Figure 17:
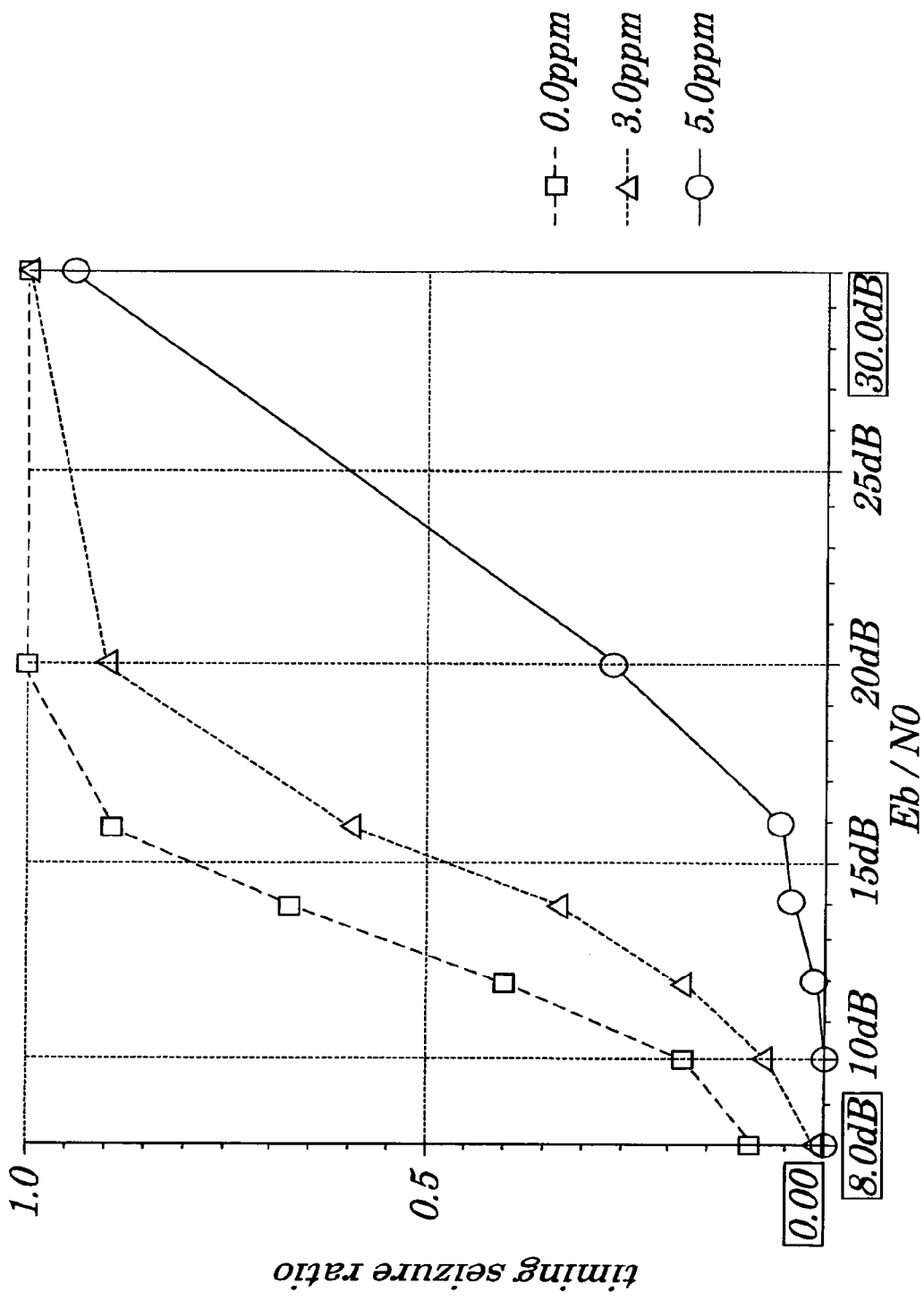
FIG. 17 is a graph showing a relationship between a probability of correct synchronization and energy versus mean noise power spectrum density (Eb/N0) per one bit of a signal when an amount of a frequency offset of a carrier frequency is used as a parameter in the conventional reverse spreading device.
Figure 18:
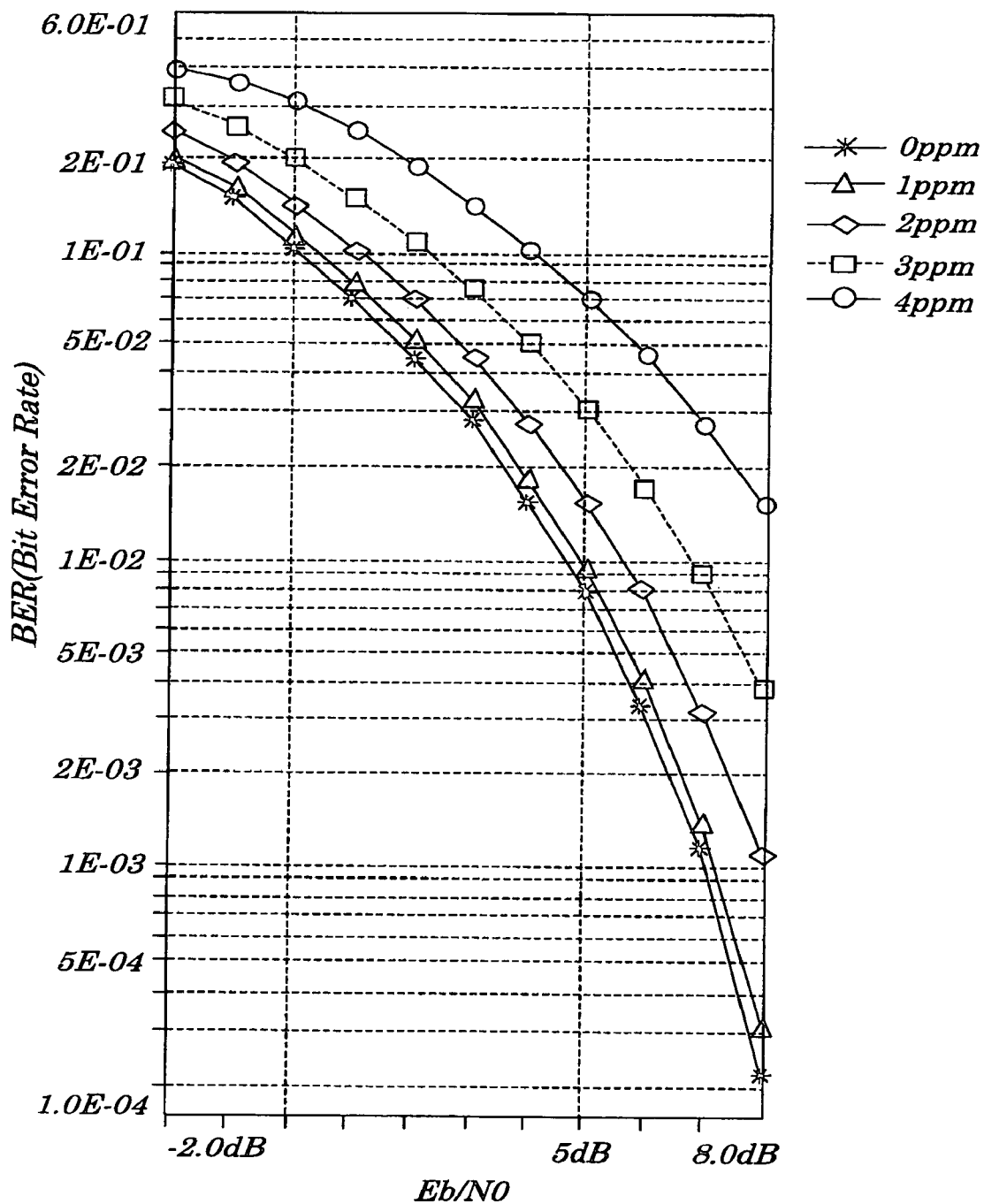
FIG. 18 is a graph showing a relationship between BER and Eb/N0 per one bit of a signal obtained when an amount of a frequency offset of a carrier frequency is used as a parameter in the conventional reverse spreading device.
Figure 19:
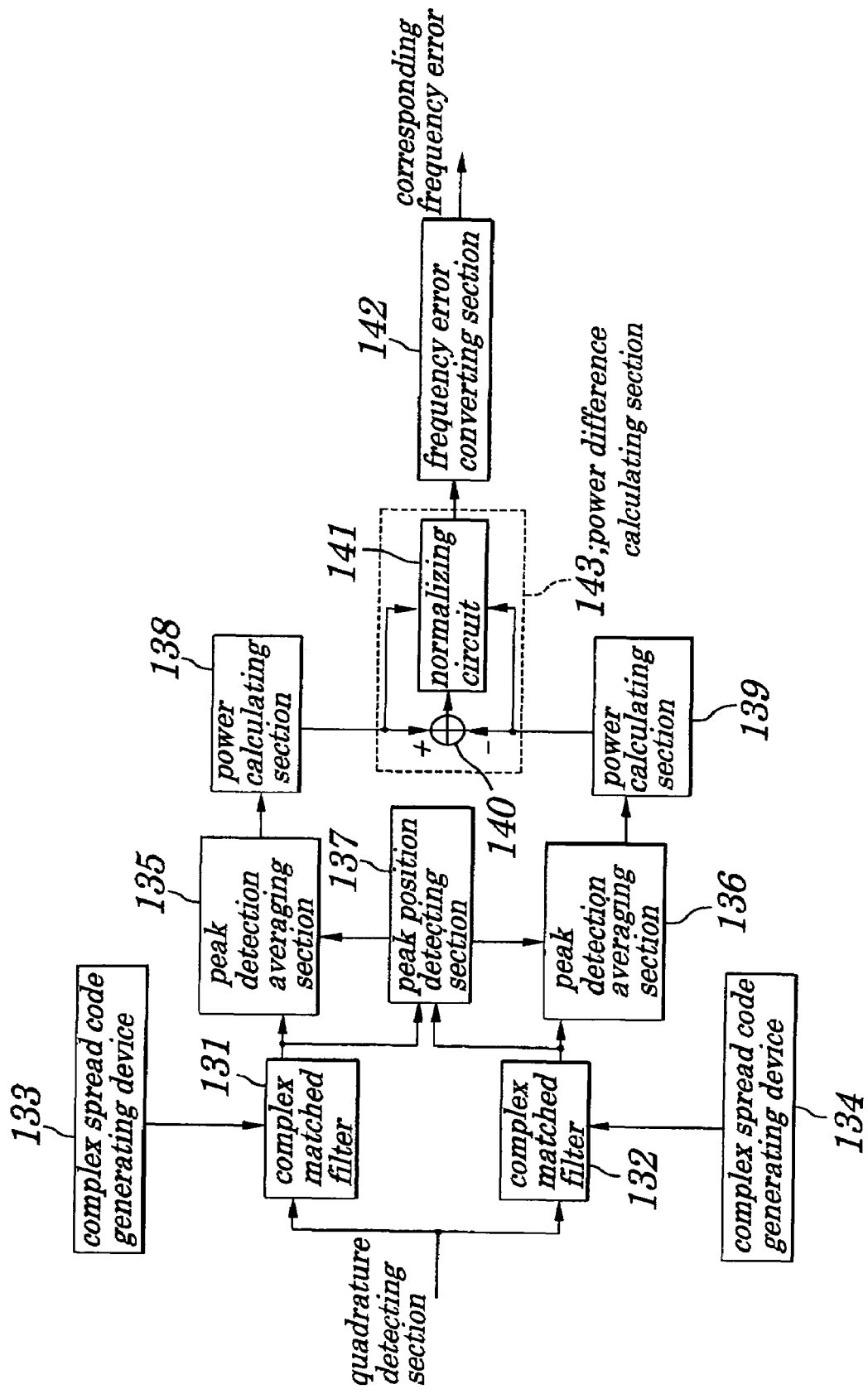
FIG. 19 is a schematic block diagram showing configurations of a frequency error detecting circuit containing an other conventional reverse spreading device.

Though, in the first embodiment described above, the present invention is applied to a correlator using a digital matched filter, according to a second embodiment, the present invention is applied to a sliding type correlator. FIG. 7 is a schematic block diagram showing configurations of a reverse spreading device according to a second embodiment of the present invention. In FIG. 7, configurations having same reference numbers as in FIG. 14 are same configurations.

According to the second embodiment, a reverse spreading device is composed of correlator 60 and correlator 70, a phase rotator 81, adder 91 and adder 101 and delay device 92 and delay device 102. In the correlator 60, a base band signal 11 composed of an I component is multiplied by a spread signal by a multiplier 62 for every chip and is then integrated sequentially by an integrator composed of an adder 63 and a delay device 64. Similarly, in the correlator 70, a base band signal 21 composed of the Q component is multiplied by a spread signal by a multiplier 72 and is then integrated sequentially by an integrator composed of an adder 73 and a delay device 74.

The phase rotator 81 is adapted to perform a rotation correction by sequentially phase-rotating a complex intermediate signal on a complex plane at "m" stages being slid by a reference rotation angle δ for every pair of complex intermediate signals. Of the complex intermediate signals obtained after the rotation correction, the intermediate signal composed of the I component is integrated "m" times by an integrator composed of the adder 91 and delay device 92 while the intermediate signal composed of the Q component is integrated "m" times by the integrator composed of the adder 101 and delay device 102 and, as a result, a correlation value of a complex symbol is obtained. The obtained complex symbol, since its phase is rotated by the phase rotator 81 and, as a result, a frequency offset is given in a pseudo manner, becomes a reversely spread complex symbol.

Though only one delay device is mounted as each of the delay devices 64, 74, 92 and 102 in FIG. 7, if an over-sampling is made at a time of receiving signals and an over-sampling rate is represented by OSR, the OSR pieces of the delay devices are connected in a string manner for each of the delay devices 64, 74, 92 and 102.

Thus, when the reverse spreading device of this embodiment is used, a same effect as in the case where the reverse spreading device of the first embodiment is used can be obtained.

Third Embodiment

In a reverse spreading device according to the first embodiment shown in FIG. 1, an intermediate signal of 1/k chip rate is produced from a chip rate signal in a middle course of reverse spreading and a correction processing is performed by being phase-rotated in a step-by-step manner. Because of this, though correction capability for frequency offset is high, configurations of the reverse spreading device of the first embodiment are made slightly complicated. That is, in the reverse spreading device of the first embodiment, as shown in FIG. 1 phase rotators $31_1$ to $31_m$ being a same number of division numbers "m" are required. Moreover, in the reverse spreading device shown in FIG. 1, since processing is required for every one symbol, a unit of rotation correction is limited to a one-to-an integer for a number of spread chips per symbol.

In a reverse spreading device of the second embodiment shown in FIG. 7, since rotation correction is performed in middle course of reverse spreading processing, integrators adapted to perform an accumulative adding processing have to be mounted on front and rear of a phase rotator 81 and as a result, two-stage accumulative adding processing is required, thus causing configurations of the reverse spreading device to be complicated as in the case of the first embodiment. As shown in FIG. 7, an integrator composed of adder 63 and adder 73 and delay device 64 and delay device 74 operate to perform a first stage accumulative adding processing and an integrator composed of an adder 91 and adder 101 and delay device 92 and delay device 102 operate to perform a second stage accumulative adding processing. Moreover, in the reverse spreading device according to the second embodiment as in the case of the first embodiment, a unit of the rotation correction is limited to a one-to-an integer for a number of spread chips per symbol.

In the above first and second embodiments, the present invention is applied to the reverse spreading device using a digital matched filter or a sliding correlator which allows divided processing of the reverse spreading as a correlator and therefore the present invention cannot be applied to the reverse spreading device using the correlator which does not allow the rotation correction by dividing the reverse spreading processing.

For example, a method for the rotation correction by dividing the reverse spreading, processing cannot be applied to a reverse spreading device using a Golay correlator (for example, 3GPP [3rd Generation Partnership Project] TSGR1-99554) as the correlator.

Figure 8:
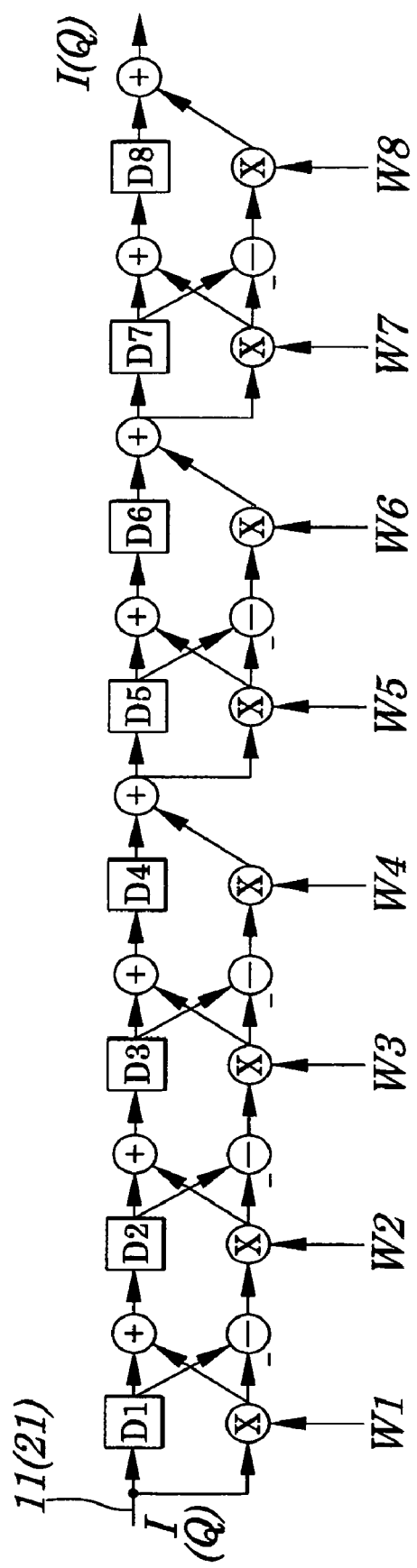
FIG. 8 is a diagram showing one example of configurations of a Golay correlator.

FIG. 8 is a diagram showing one example of configurations of the Golay correlator having a layered structure. In FIG. 8, each of delay devices D1 to D8 is composed of a flip/flop (F/F), memory or a like and each of W1 to W8 is a coefficient having a value 1 or −1.

The Golay correlator shown in FIG. 8 is so configured that the reverse spreading is performed by inputting a base band signal 11 composed of the I component (or a base band signal 21 composed of the Q component) from the left side in FIG. 8 and by a plurality of times repetition of addition/subtraction between a value with a delay of Di (i=1 to 8) clock in an upper stage and a value without a delay obtained by multiplying Wi in a lower stage.

For example, as shown in 3GPP TS25. 213 2. 4. 0, a signal spread by spread signals of 256 chips represented by $$y=[a,a,a,\bar{a}^1,\bar{a},a,\bar{a},\bar{a},a,a,a,\bar{a},a,\bar{a},a]$$ (Formula 1):

[D1,D2,D3,D4,D5,D6,D7,D8]=[128,64,16,32,8,1,4,2]

[W1,W2,W3,W4,W5,W6,W7,W8]=[1,−1,1,1,1,1,1,1]

where "a" (Formula 1) is a bit string composed of 16 bits shown as below and "ā" is a bit string obtained by inverting the bit string "a".

a=[0,0,0,0,0,0,1,1,0,1,0,1,0,1,1,0]

ā=[1,1,1,1,1,1,0,0,1,0,1,0,1,0,0,1]

Though it is impossible for the Golay correlator to reversely spread a signal spread by an arbitrary spread code, if a correlator having configurations of the Golay correlator can be used, the capacity of a memory for delay or the circuit scale of the adder can be reduced more when compared with the case where the matched filter is used.

Though the Golay correlator is configured so as to be suitable for reversely spreading one symbol signal at a time, as described above, it can not perform the reverse spreading in a state that the reverse spreading processing is divided into parts in the division number "m" which is a divisor of a spreading rate. Therefore, the rotation correction cannot be done in the middle course of the reverse spreading. The reverse spreading device of has solved problems presented in the above first and second embodiments.

Figure 9:
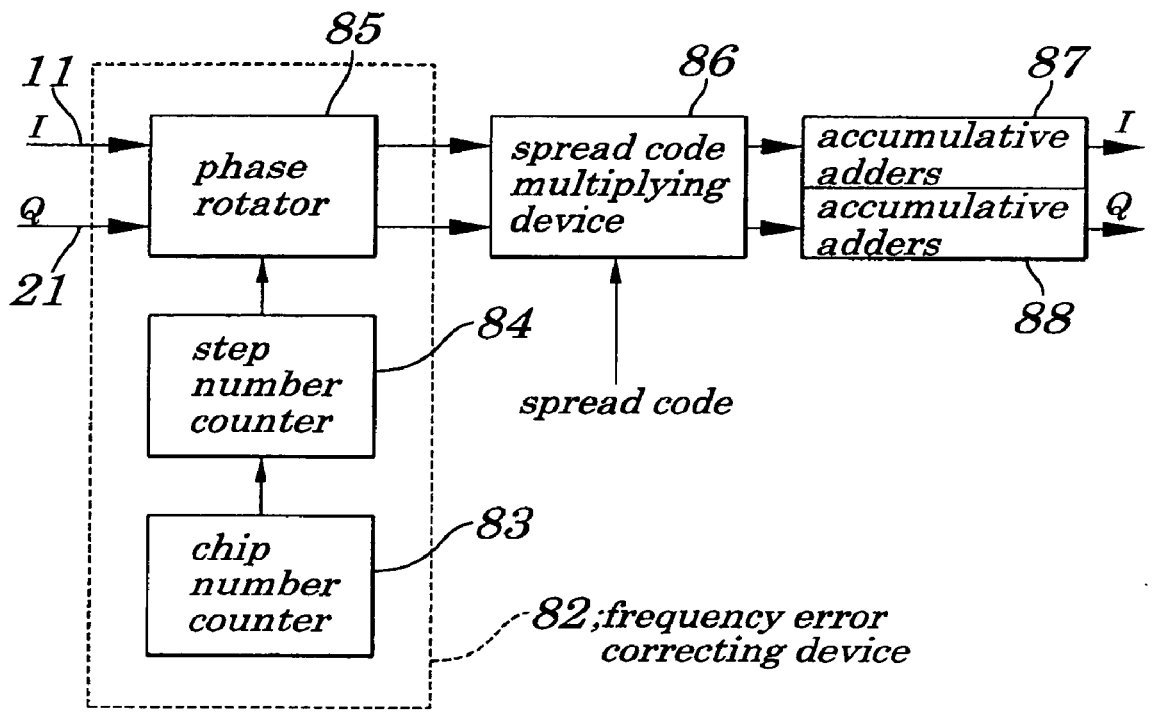
FIG. 9 is a schematic block diagram showing configurations of a reverse spreading device according to a third embodiment of the present invention.

The reverse spreading device of this embodiment, as shown in FIG. 9, is composed of a frequency error correcting device 82, a spread code multiplying device 86 and accumulative adder 87 and accumulative adder 88. The frequency error correcting device 82 is composed of a chip number counter 83, a step number counter 84 and a phase rotator 85.

The chip number counter 83 is adapted to sequentially count a number of chips of a digital base band signal 11 composed of a I component and a digital base band signal 21 composed of a Q component. Every time the number of chips increases by K chips, the chip number counter 83 instructs the step number counter 84 to increment a step number.

The step number counter 84, if the outputted step number is a number other than M−1, is adapted to increase the step number by one in accordance with increment instruction fed from the chip number counter 83 and, if the step number is M−1, to return the step number to 0 instead of increasing it by one.

The phase rotator 85 is able to perform rotation processing in steps of a reference rotation angle being an angle obtained by dividing "2π" which is a rotation angle of a revolution into M steps and is adapted to perform the rotation correcting processing by rotating phase on a complex plane of the base band signal 11 composed of the I component and the base band signal 21 of the Q component at a phase rotation angle corresponding to the step number of the step number counter 84 out of the phase rotation angles at M stages set in advance.

The spread code multiplying device 86 operates to multiply the base band signal 11 composed of the I component and the base band signal 21 composed of the Q component both being obtained by providing the rotation correction using the phase rotator 85 by each of spread codes.

The accumulative adder 87 and accumulative adder 88 are adapted to produce correlation values between the I component and Q component by adding, in an accumulative manner, multiplied values obtained from the spread code multiplying device 86 for each of the I component and Q component for one symbol period.

Next, operations of the reverse spreading device according to the embodiment will be described by referring to the attached drawings.

Base band signal 11 and base band signal 21, each being an RF (Radio Frequency)—demodulated digital signal, composed respectively of the I component and the Q component are first inputted to the frequency error correcting device 82.

The step number is incremented between "0 to (M−1)" or is returned to "0" for every K chips by two counters including the chip number counter 83 and the step number counter 84. By decrementing the step number or returning it to "0", frequency offset can be corrected in reverse direction to the increment.

Figure 10:
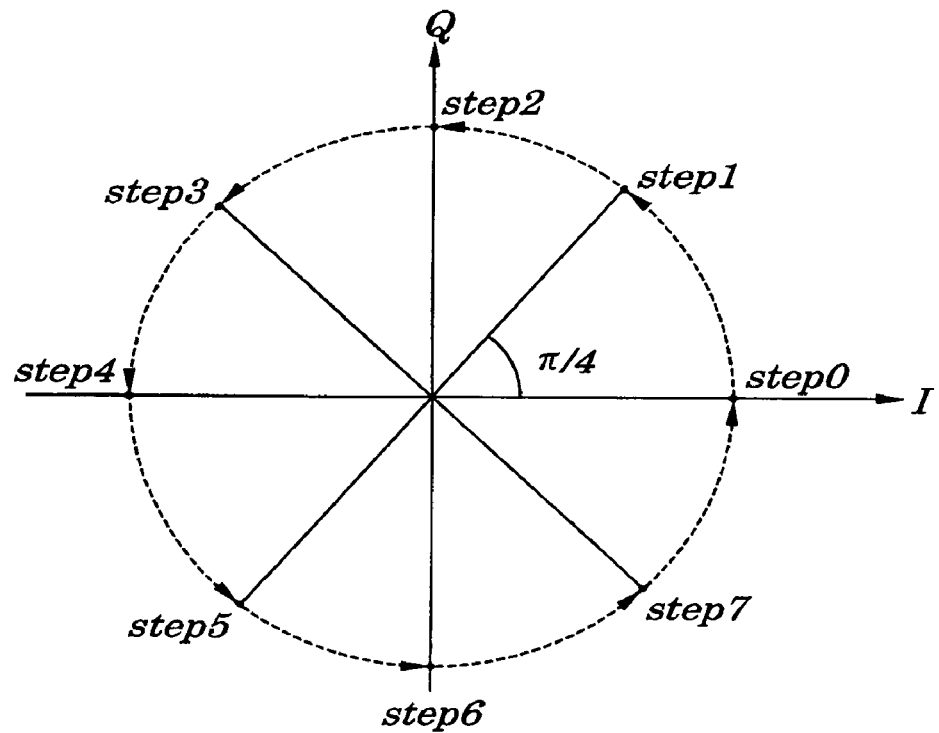
FIG. 10 is a diagram showing a state of phase rotation in a case of M being 8 to be performed by a phase rotator 85 shown in FIG. 9.

The phase rotator 85 is adapted to perform the rotation correction processing on the base band signal 11 and base band signal 21 composed of the I component and Q component respectively at a phase rotation angle corresponding to a step number fed from the step number counter 84. FIG. 10 is a diagram showing a state of phase rotation in the case of M being 8 to be performed by a phase rotator 85 shown in FIG. 9. In this case, a step of an amount of phase rotation for every step is $\pi/4$. That is, a reference rotation angle is $\pi/4$.

The output from the frequency error correcting device 82 is inputted into the accumulative adder 87 and accumulative adder 88 through the spread code multiplying device 86. The base band signals composed of the I component and Q component that have undergone the rotation correction processing, after being multiplied by the spread code, receive accumulative addition for one symbol period and then decoded as information symbols before spreading.

By using the reverse spreading device of this embodiment, even when there is a great frequency offset in a reference oscillator between base station and mobile station, it is possible to avoid reduction of spread gain. For example, in the case of a PCCPCH (Primary Common Control Physical Channel) in accordance with W-CDMA 3GPP, if there is a 4 ppm frequency offset at a carrier frequency 2 GHz, in a state without ordinary rotation correction, noise characteristic is degraded by 4 dB. However, by applying the present invention, degree of the degradation of the noise characteristic in the case of appropriate frequency correction can be lowered to 0.3 dB.

In the reverse spreading device of the above first and second embodiments, since the rotation correction is made in the middle course of the reverse spreading processing, the present invention can be applied only to the correlator in which the reverse spreading processing can be divided such as matched filters or sliding correlators. However, in the reverse spreading device of this third embodiment, since the phase rotation correction is carried out prior to the reverse spreading processing, no change in the conventional reverse spreading processing is required for the reverse spreading processing at latter stage, thus providing freedom in configuring the correlator. Therefore, the Golay correlator having layered structure as shown in FIG. 8 can be used as the correlator.

Moreover, unlike the reverse spreading device of the first embodiment which requires the same number of phase rotators as the division number "m", the reverse spreading device of the third embodiment, since it requires only one phase rotator, can be constructed to have a simpler circuit configuration. Furthermore, unlike the reverse spreading device of the second embodiment which requires second stage accumulative adding processing, the reverse spreading device of the third embodiment, since it requires only one stage for the accumulative adding processing, can be constructed to have a simpler circuit configuration.

In the reverse spreading device of the first and second embodiment, since the rotation processing is performed in middle course of the reverse spreading processing, the processing has to be made for every symbol and since unit of the rotation correction is limited to one-to-an integer for number of spread chips per symbol. However, in the reverse spreading device of the third embodiment, since the rotation correction processing is made prior to the reverse spreading processing, the correction processing unit can be set independently of symbol spreading rate.

Figure 11:
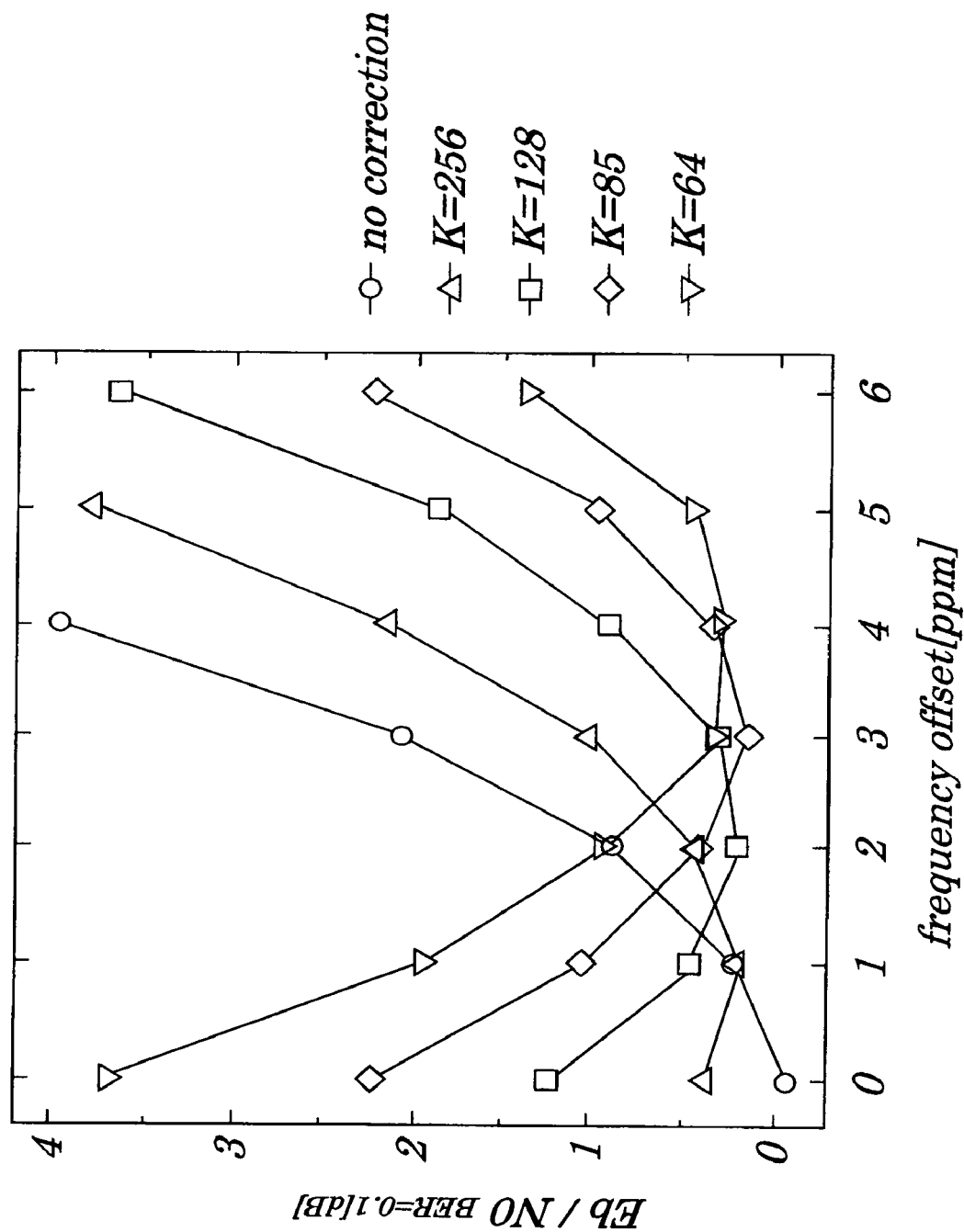
FIG. 11 is a graph showing a relation between a frequency offset in a carrier frequency and a value of the noise strength Eb/N0 required for a BER to become a value of 0.1 in the reverse spreading device in FIG. 9.

If the rotation stage in one revolution is set to 8 stages as shown in FIG. 10, a necessary phase rotation angle can be limited to $\pi/4$, $\pi/2$, $\pi$ and a sum of them. Required rotation processing is only code inversion for "$\pi$" and only a replacement of the I component and Q component and the calculation of the code inversion. To be exact, though a multiplication using $\sin \pi/4 (=2^{1/2}/2)$ for $\pi/4$ angle is required, no degradation in performance is found even if an approximation that $\sin \pi/4 = 3/4$ is made. The 8 stage phase rotator can be implemented by circuit configurations including a shift register, adder and selector. FIG. 11 shows a result of simulation on noise strength Eb/N0 required for BER to become 0.1 in an environment where frequency error exists, PCCPCH is demodulated by the Approximation that $\sin \pi/4 = 3/4$. The value "k" shown in FIG. 11 represents a number of chips staying at each step when phase rotation is made and, if this value is smaller, frequency offset can be corrected more. For example, if a value K=85, in an environment where frequency offset is 3 ppm, noise tolerance is stronger by about 2 dB when compared with a case where no rotation correction exist.

As described above, according to the reverse spreading device of the present invention, since the timing detection and channel estimation can be performed, even in the large frequency offset environment, without the great increase in the circuit scale and power consumption, the range being within the AFC can be expanded.

It is apparent that the present invention is not limited to the above embodiments but may be changed and modified without departing from the scope and spirit of the invention.

What is claimed is:

1. A method for measuring a frequency error being a difference between a reference frequency of a receiver and a reference frequency of a sender comprising the steps of:

counting how many chips of complex base band signals are to be input;

performing a rotation correction in a step-by-step manner by rotating a phase of said complex base band signal on a complex plane at a phase rotation angle at m-stages each being slid by a reference rotation angle being an angle obtained by dividing a rotation angle ($2\pi$) of a revolution to M portions every time said counted number of the chips increases by K-chips;

producing a multiplied value by multiplying the rotation corrected complex base band signals by spread signals;

producing a correlation value of I component of said multiplied value and a correlation value of Q component of said multiplied value by adding said multiplied value in an accumulative manner for every I component and every Q component during one symbol period;

calculating a power value of the complex base band signal in said one symbol period based on said correlation values of said I component and said Q component; and selecting said reference rotation angle so that said power value becomes maximum.

2. The method according to claim 1, further comprising detecting said frequency error based on said reference rotation angle selected.

3. A reverse spreading device for reversely spreading complex base band signals, each of said complex base band signals being composed of an I component and a Q component and being spread by spread codes, said device comprising:

a frequency error corrector to count how many chips of said complex base band signals to be input and to perform a rotation correction in a step-by-step manner by rotating a phase of said complex base band signals on a complex plane at a phase rotation angle at m-stages each being slid by a reference rotation angle every time a count of the chips increases by K-chips;

a spread code multiplier producing a multiplied value by multiplying each of the rotation corrected complex base band signals by said spread codes;

two accumulative adders to produce a correlation value of I component of said multiplied value and a correlation value of Q component of said multiplied value by performing accumulative addition of said multiplied value for one symbol period;

a power calculator calculating a power value of said complex base band signal in said one symbol period based on said correlation values of said I component and said Q component; and a selector selecting said reference rotation angle so that said power value becomes maximum.

4. The device according to claim 3, further comprising a frequency error detector detecting a frequency error based on said reference rotation angle selected by said selector.

5. A timing detecting device, comprising: the reverse spreading device of claim 3; and a peak detecting circuit configured to receive the correlation value of the I component and the correlation value of the Q component, and detect spreading timing as a function of sizes of the correlation values of the I and Q components.

* * * * *